(12) United States Patent
Sawada

(10) Patent No.: US 6,909,222 B2
(45) Date of Patent: Jun. 21, 2005

(54) PIEZOELECTRIC ACTUATOR, AND TIMEPIECE AND PORTABLE EQUIPMENT HAVING THE SAME

(75) Inventor: Akihiro Sawada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 115 days.

(21) Appl. No.: 10/377,858

(22) Filed: Feb. 28, 2003

(65) Prior Publication Data

US 2004/0017131 A1 Jan. 29, 2004

(30) Foreign Application Priority Data

Mar. 1, 2002 (JP) ........................................ 2002-055784

(51) Int. Cl.[7] ...................... H01L 41/083; H01L 41/047
(52) U.S. Cl. ........................ 310/328; 310/331; 310/348; 310/364; 310/365; 367/157
(58) Field of Search ................................. 310/328, 331, 310/348, 364, 365, 367; 368/67, 187; 367/157

(56) References Cited

U.S. PATENT DOCUMENTS

| | | | |
|---|---|---|---|
| 4,348,752 A | * 9/1982 | Perucchi | 368/187 |
| 5,247,220 A | * 9/1993 | Miyazawa et al. | 310/323.05 |
| 6,177,754 B1 | * 1/2001 | Suzuki et al. | 310/323.09 |
| 6,744,176 B2 | * 6/2004 | Dinger | 310/323.05 |

FOREIGN PATENT DOCUMENTS

| | | | | |
|---|---|---|---|---|
| EP | 1 075 079 | | 2/2001 | H02N/2/00 |
| JP | 5-3688 | | 1/1993 | H02N/2/00 |
| JP | 11-103584 | | 4/1999 | H02N/2/00 |
| JP | 2000-188884 | | 7/2000 | H02N/2/00 |
| JP | 2000-333480 | | 11/2000 | H02N/2/00 |
| JP | 2001327180 A | * | 11/2001 | H02N/2/00 |
| WO | WO 00/38309 | | 6/2000 | H02N/2/00 |

* cited by examiner

Primary Examiner—Darren Schuberg
Assistant Examiner—J. Aguirrechea
(74) Attorney, Agent, or Firm—Michael T. Gabrik

(57) ABSTRACT

A diaphragm 10 is fixed to a base plate 102 by a screw 13. A lever 20 has a spring member 23, a rotor-fixing member 25, and an insertion hole 22 formed therein. By passing a shaft 21 through the insertion hole 22, the lever 20 is turnably supported so as to turn about its own axis. In a state in which the spring member 23 abuts against an eccentric pressure-adjusting cam 26, a pressing force for urging the diaphragm 10 via the rotor 100 is adjusted by turning the pressure-adjusting cam 26 so as to change an elastic force of the spring member 23.

31 Claims, 20 Drawing Sheets

| | FREQUENCY OF LONGITUDINAL VIBRATION | FREQUENCY OF BENDING SECONDARY VIBRATION |
|---|---|---|
| WITH ABUTMENT MEMBER | 281kHZ | 290kHZ |
| WITHOUT ABUTMENT MEMBER | 279kHZ (284.3kHZ) | 286kHZ (288.36kHZ) |
| DIFFERENCE IN FREQUENCIES | 2kHZ | 2kHZ |

PIEZOELECTRIC ACTUATOR, AND TIMEPIECE AND PORTABLE EQUIPMENT HAVING THE SAME

TECHNICAL FIELD

The present invention relates to a piezoelectric actuator having a piezoelectric element, and a timepiece as well as a portable apparatus equipped with the same.

BACKGROUND ART

A piezoelectric element is excellent in conversion efficiency and response from electric energy to mechanical energy. Therefore, a variety of piezoelectric actuators utilizing a piezoelectric effect of the piezoelectric element have been developed in recent years. The piezoelectric actuators have been applied to products such as a piezoelectric buzzer, an inkjet head of a printer, and an ultrasonic motor. Recently, applications of the piezoelectric actuators to those, such as a calendar indicating mechanism of a wrist watch, which have been strongly required to be miniaturized, have been studied.

FIG. 36 is a schematic illustration of a wrist watch having a calendar indicating mechanism using a piezoelectric actuator. As shown in the figure, the calendar indicating mechanism has a piezoelectric actuator A1, a rotor 1, an intermediate wheel 2, and a ring-shaped date indicator 3 on which a date and a day of the week are indicated.

The rotor 1 rotatably supported by a base plate (base) 4 so as to rotate about its own axis is driven to rotate by the piezoelectric actuator A1 in the direction indicated by the arrow Y shown in the figure. The rotor 1 engages with the intermediate wheel 2 rotatably supported by the base plate 4 so as to rotate about its own axis, and the intermediate wheel 2 engages with the date indicator 3. With this structure, as the rotor 1 driven by the piezoelectric actuator A1 rotates, the date indicator 3 rotates in the direction indicated by the arrow Z shown in the figure.

FIG. 37 is a plan view illustrating the structure of the foregoing piezoelectric actuator A1. As shown in the figure, the piezoelectric actuator A1 has a diaphragm 5 having a flat, strip-shaped piezoelectric element. The diaphragm 5 has an abutment member 6 at one vertex thereof where one of its long sides and one of its short sides intersect with each other, and the abutment member 6 has a top having a gently curved surface and protrudes from the piezoelectric element. Also, a support member 7 for supporting the diaphragm 5 on the base plate 4 is disposed in the vicinity of the center of the long side of the diaphragm 5 in a manner such that the support member 7 extends out from the diaphragm 5, and a spring member 8 is disposed so as to be opposite to the support member 7. The support member 7 is loosely fitted into a pin 7a disposed in a standing manner on the base plate 4 so that the diaphragm 5 can turn about the pin 7a. Also, the top of the spring member 8 is supported by a shaft 9 disposed on the base plate 4 in a standing manner. With this arrangement, the diaphragm 5 is pressed against the rotor 1 by an elastic force of the spring member 8, and the abutment member 6 abuts against the side surface of the rotor 1.

When an alternating drive signal is fed to the piezoelectric element, the diaphragm 5 vibrates in the direction indicated by the arrow X shown in the figure in a state where the abutment member 6 abuts against the rotor 1. This vibration is forwarded to the rotor 1 via the abutment member 6. The rotor 1 receiving this vibration as a drive force rotates in the arrow Y direction.

Meanwhile, in such a piezoelectric actuator A1, the amplitude of a vibration is on the order of micrometers or sub-micrometers. In order to continuously transmit such a fine vibration to the rotor 1, it is needed to press the abutment member 6 of the diaphragm 5 against the rotor 1 with an appropriate pressing force.

In order to achieve this, the support member 7 is fixed to the pin 7a with play (movable clearance), for example, in a manner such that the support member 7 has a perforation having a diameter slightly greater than that of the pin 7a and the pin 7a is inserted into this perforation, and the diaphragm 7 is arranged so as to turn about the pin 7a with an elastic force of the spring member 8.

This play (movable clearance) causes the following two problems.

First, the piezoelectric actuator A1 causes the other portion of the diaphragm 5, which is unnecessary for driving the rotor 1, to vibrate, thereby leading to a loss of energy and a reduced driving efficiency.

Second, since nonuniform contact of the abutment member 6 of the diaphragm 5 with the rotor 1 always causes its drive force for driving the rotor 1 to be unstable, the piezoelectric actuator A1 has an unstable driving characteristic.

In addition, since the diaphragm 5 itself vibrates, it is required to provide redundancy to wire lines or the like used for feeding a drive signal to the diaphragm 5, taking account of a change in length of the wiring route of the wire lines or the like. Furthermore, since the diaphragm 5 itself vibrates, connected portions of the wire lines are likely to fall off, thereby causing a problem of reduced reliability of the piezoelectric actuator A1.

DISCLOSURE OF INVENTION

An object of the present invention is to provide an efficient and reliable piezoelectric actuator that exhibits stable driving characteristics during operation, and also to provide a timepiece and portable apparatus equipped with such a piezoelectric actuator.

According to one aspect of the invention, a piezoelectric actuator comprises a base, and a diaphragm which comprises at least one plate-like piezoelectric element and a plate-like backing material affixed thereto and which is adapted to move in the plane of the diaphragm in response to a drive signal applied thereto. The backing material comprises a fixing member that is fixed to the base so as to eliminate rotational movement of the diaphragm and to restrict movement of the diaphragm to the plane of the diaphragm, and an abutment member disposed on the diaphragm. The piezoelectric actuator further comprises a pressing mechanism configured to apply a pressing force so as to engage the abutment member with an object to be driven.

The fixing member preferably maintains the at least one piezoelectric element in a position spaced apart from the base. Preferably, the fixing member is fixed to the base by a screw.

Preferably, the piezoelectric actuator further comprises an adjusting mechanism for adjusting the pressing force applied by the pressing mechanism, the latter of which is preferably a spring and more preferably a curved-shaped spring.

In one variation, the at least one plate-like piezoelectric element comprises first and second piezoelectric elements respectively stacked on front and rear surfaces of the backing material, each of the first and second piezoelectric elements comprising a plurality of electrode plates; the fixing member is formed as a part of the backing material and extends out from the piezoelectric elements, the fixing member comprising a lead board fixed thereto, the lead board including contact terminals for electrically connecting the lead board to a drive circuit configured to generate the drive signal and to drive the first and second piezoelectric elements; and each of the plurality of electrode plates of the first and second piezoelectric elements has at least one contact spot that is connected to a contact terminal on the lead board by a bonding wire, each contact terminal and contact spot and portion of the bonding wire connected thereto being covered by a potting layer.

Preferably, two of the electrode plates are connected to each other by a bonding wire extending around a side edge of the diaphragm. Also, each of the contact spots preferably provides a node point in the corresponding electrode plate when the diaphragm vibrates.

The piezoelectric actuator preferably further comprises a circuit board equipped with the drive circuit, the circuit board including contact terminals for electrical connection to the drive circuit, and a pressing-force applying mechanism configured to apply a pressing force between the lead board and the circuit board to maintain electrical contact between corresponding contact terminals on the boards.

Preferably, the pressing-force applying mechanism also fixes the fixing member to the base and further has a screw-fastening function.

In another variation, the at least one plate-like piezoelectric element comprises first and second piezoelectric elements respectively stacked on front and rear surfaces of the backing material, each of the first and second piezoelectric elements comprising a plurality of electrode plates, and the plurality of electrode plates of the first and second piezoelectric elements are electrically connected to a flexible printed circuit board extending to the fixing member which is formed as a part of the backing material and which extends out from the piezoelectric elements.

Preferably, two of the electrode plates are connected to each other by the flexible printed circuit board extending around a side edge of the diaphragm, and each spot of the electrode plates which is connected to the flexible printed circuit board provides a node point in the corresponding electrode plate when the diaphragm vibrates.

Preferably, the piezoelectric actuator further comprises a circuit board equipped with a drive circuit and including contact terminals electrically connected to the drive circuit, and a pressing-force applying mechanism configured to apply a pressing force between a portion of the flexible printed circuit board extending to the fixing member and the circuit board to maintain electrical contact between corresponding contact terminals on the boards.

In another aspect, the invention involves a piezoelectric actuator comprising a base, and a diaphragm which comprises at least one plate-like piezoelectric element and a plate-like backing material affixed thereto and which is adapted to move in the plane of the diaphragm in response to a drive signal applied thereto. The backing material comprises a fixing member that is fixed to the base so as to eliminate rotational movement of the diaphragm and to restrict movement of the diaphragm to the plane of the diaphragm, and an abutment member disposed on the diaphragm. The piezoelectric actuator further comprises an object to be driven in response to movement of the diaphragm via the abutment member which is in contact with the object to be driven, and a pressing mechanism configured to apply a pressing force on the abutment member from the object to be driven.

Preferably, the object to be driven comprises a rotor adapted to rotate in response to a drive force transmitted by the abutment member resulting from movement of the diaphragm, and the pressing mechanism comprises a lever having a rotor-fixing member at one end portion thereof adapted to rotatably hold the rotor and a spring at another end portion thereof for producing an elastic force as the pressing force. The a spring is preferably adapted to urge the rotor against the abutment member.

Preferably, the piezoelectric actuator further comprises an adjusting mechanism configured to adjust the elastic force applied by the pressing mechanism. More preferably, the adjusting mechanism comprises an eccentric cam which is rotatably supported by the base so as to rotate about its own axis and which adjusts the pressing force that urges the rotor against the abutment member by forcibly pressing one end thereof against the spring.

According to another aspect of the invention, a timepiece employing a piezoelectric actuator as described above is provided. Additionally, the timepiece comprises a drive circuit for supplying the drive signal to the at least one piezoelectric element, a power source for supplying power to the drive circuit, and means for indicating time-information including calendar information, driven by the piezoelectric actuator.

In yet another aspect, the invention pertains to a portable apparatus having a piezoelectric actuator as described above. Additionally, the portable apparatus comprises a drive circuit for supplying the drive signal to the at least one piezoelectric element, a power source for supplying power to the drive circuit, and an object to be driven by the piezoelectric actuator.

Preferably, the at least one plate-like piezoelectric element comprises a plurality of electrode plates, all of which are electrically insulated from a reference potential portion of the time piece.

Preferably, the base comprises a non-conductive material, and the timepiece or portable apparatus further comprises an insulating plate sandwiched between the base and the fixing member.

According to a further aspect of the invention, a diaphragm includes a plate-like backing material; at least one flat, generally rectangular piezoelectric element stacked on the backing material, the piezoelectric element having a long side dimension and a short side dimension; and an abutment member disposed in close proximity to the short side of the piezoelectric element. In accordance with this aspect of the invention, when a longitudinal vibration in the long side dimension of the at least one piezoelectric element and a bending secondary vibration in the plane thereof are produced in the piezoelectric element, the abutment member moves along an elliptic path, and wherein the length of the long side dimension a and the length of the short side dimension b satisfy the condition $b/a \geq 0.274$.

Variations include the backing material being integrally formed with the abutment member, or the backing material comprising a fixing member integrally formed therewith for fixing the diaphragm to a base.

Preferably, the at least one piezoelectric element comprises a plurality of piezoelectric elements each having the same shape, at least one of which is stacked on the front surface of the backing material and at least one of which is stacked on the rear of the backing material.

In another aspect of the invention, the above described diaphragm further comprises an object to be driven in response to movement of the at least one piezoelectric element via the abutment member which is in contact with the object to be driven.

According to still another aspect of the invention, a timepiece comprises a plate-like backing material; at least one flat, generally rectangular piezoelectric element stacked on the backing material, the piezoelectric element having a long side dimension and a short side dimension; an abutment member disposed in close proximity to the short side of the at least one piezoelectric element; and an object to be driven in response to movement of the at least one piezoelectric element via the abutment member which is in contact with the object to be driven; a drive circuit for supplying the drive signal to the at least one piezoelectric element; a power source for supplying power to the drive circuit; and means for indicating time-information including calendar information, driven by the piezoelectric actuator. In accordance with this aspect of the invention, when a longitudinal vibration in the long side dimension of the at least one piezoelectric element and a bending secondary vibration in the plane thereof are produced in the piezoelectric element, the abutment member moves along an elliptic path; and wherein the length of the long side dimension a and the length of the short side dimension b satisfy the condition $b/a \geq 0.274$.

BEST MODE FOR CARRYING OUT THE INVENTION

An embodiment of the present invention will be described with reference to the drawings.

A. General Structure

Figure 1:
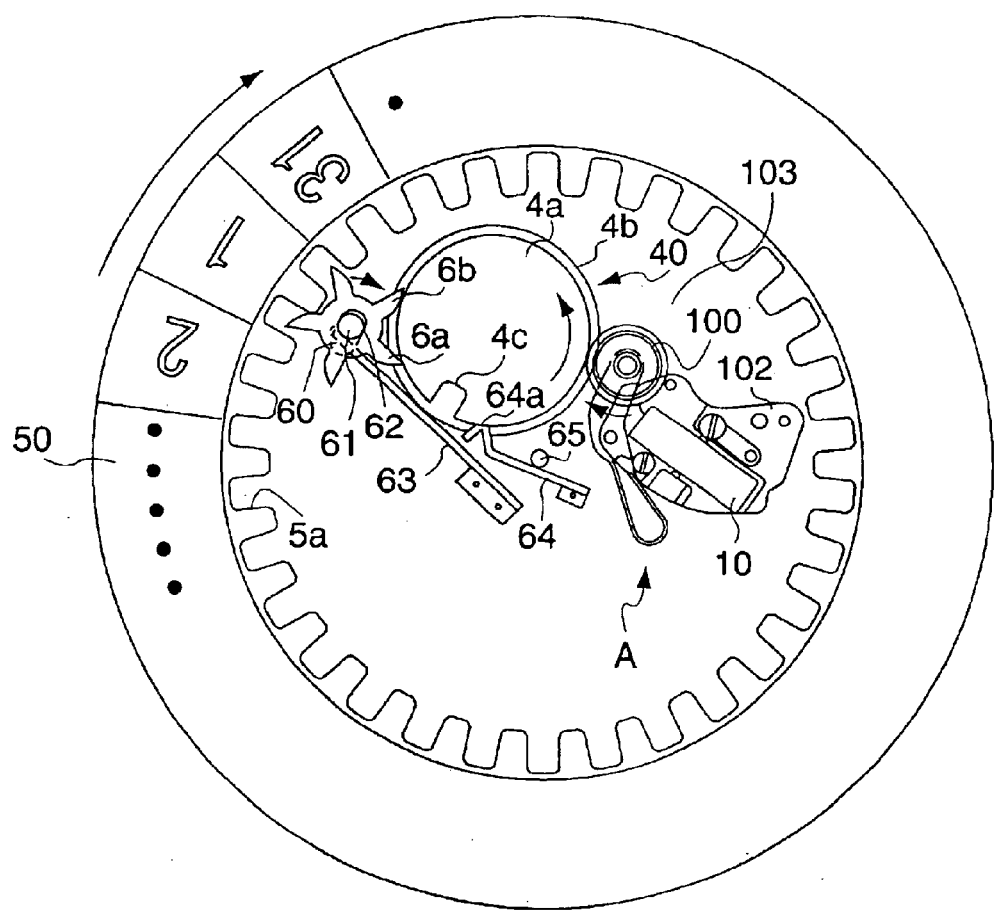
FIG. 1 is a plan view illustrating the structure of the major part of a calendar indicating mechanism of a watch according to an embodiment of the present invention.

FIG. 1 is a plan view illustrating the structure of a calendar indicating mechanism of a wrist watch in which a piezoelectric actuator A according to an embodiment of the present invention is incorporated.

As shown in FIG. 1, the piezoelectric actuator A has a base plate 102, a rectangular diaphragm 10, and a rotor 100. The rotor 100 is an object to be driven by the diaphragm 10 and rotates clockwise so as to transmit a drive force to a date indicator 50 when its outer circumferential surface is hit upon receiving a vibration produced in the diaphragm 10.

The rotor 100 is coupled with the ring-shaped date indicator 50 having a date-forwarding intermediate wheel 40 and a date-forwarding wheel 60 interposed therebetween, these wheels serving as a speed-reduction wheel train. The date indicator 50 is driven to rotate by the rotor 100 in conjunction with the drive of the rotor 100.

Figure 2:
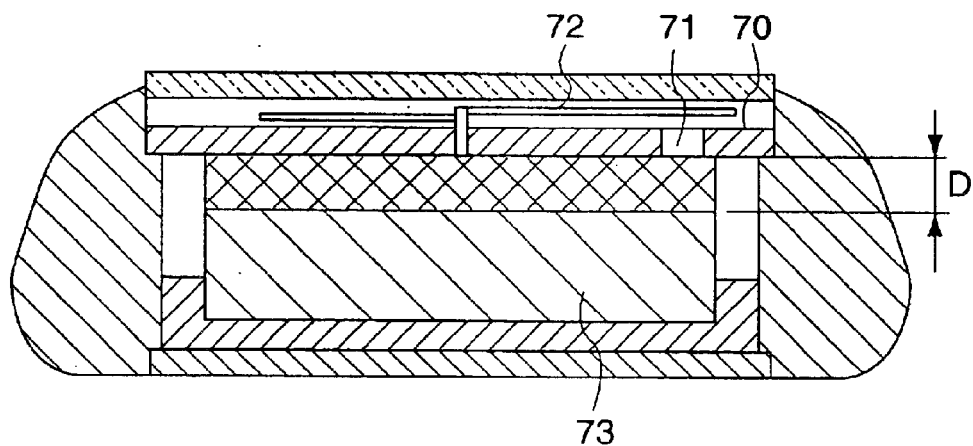
FIG. 2 is a sectional view of the schematic structure of the watch according to the embodiment.

FIG. 2 is a sectional view of the watch shown in FIG. 1. The calendar indicating mechanism having the piezoelectric actuator A is incorporated in the meshed part shown in the figure. The calendar indicating mechanism has a diskshaped dial 70 disposed thereon. The dial 70 has a window 71 for displaying a date and disposed at a portion of the periphery thereof so that a date displayed by the date indicator 50 can be seen from the window 71. Also, the dial 70 has a movement 73 and a drive circuit 500, which will be described later, for driving hands 72 disposed thereunder.

B. Structure of Calendar Indicating Mechanism

Figure 3:
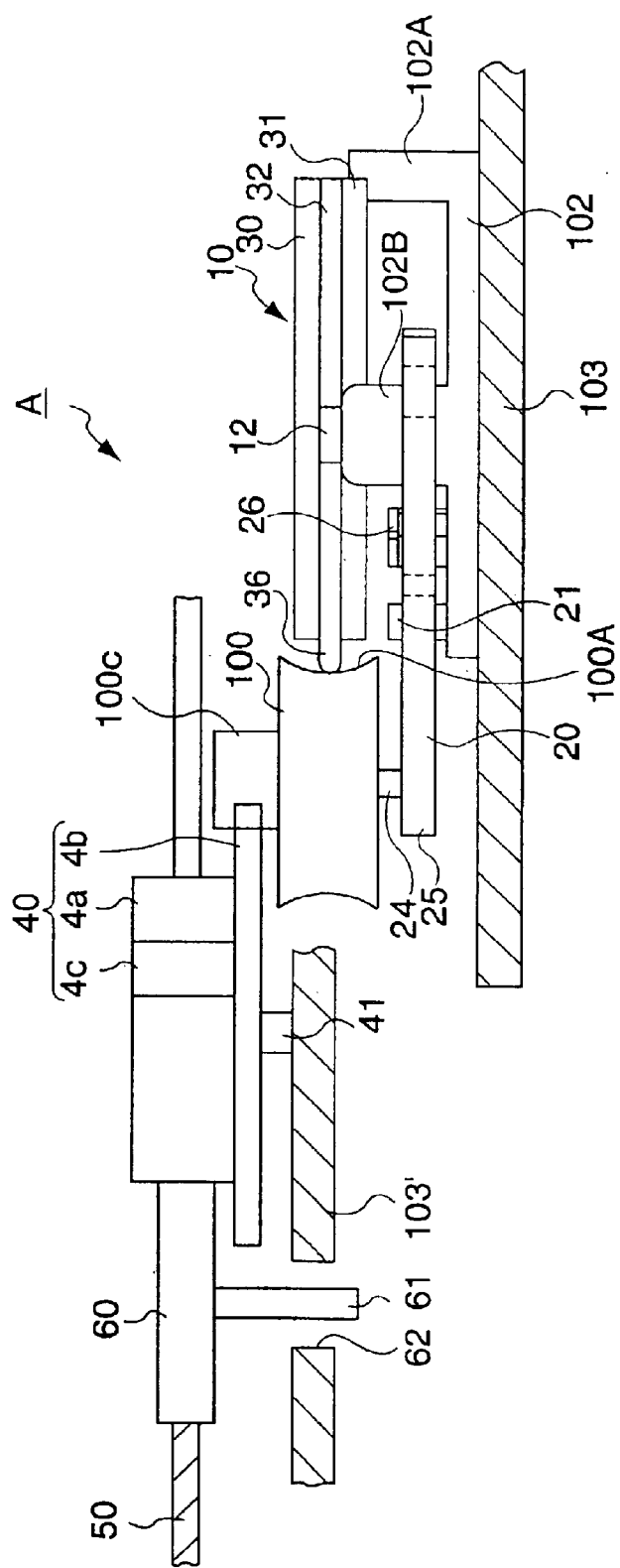
FIG. 3 is a sectional view illustrating the major part of the calendar indicating mechanism according to the embodiment.

FIG. 3 is a sectional view illustrating the detail structure of the calendar indicating mechanism shown in FIG. 1. In FIG. 3, the structure of the calendar indicating mechanism of the watch is illustrated wherein the piezoelectric actuator A is excluded. As shown in FIG. 3, the watch has a first bottom plate 103 and a second bottom plate 103' which is disposed far and away from the bottom plate 103. The second bottom plate 103' has the calendar indicating mechanism mounted thereon wherein the piezoelectric actuator A is excluded, and the first bottom plate 103 has the piezoelectric actuator A mounted thereon.

As shown in FIG. 3, the second bottom plate 103' has a shaft 41 standing thereon for rotatably supporting the date-forwarding intermediate wheel 40. The date-forwarding intermediate wheel 40 has a bearing (not shown) disposed on the lower surface thereof so as to accommodate the top of the shaft 41 in the bearing. The date-forwarding intermediate wheel 40 is formed by a small-diameter member 4a and a large-diameter member 4b. The small-diameter member 4a has a cylindrical shape having a diameter slightly smaller than that of the large-diameter member 4b, and has an approximately square notch 4c formed on the outer circumferential surface thereof. The small-diameter member 4a is concentrically fastened to the large-diameter member 4b. The large-diameter member 4b engages with a gear 100c disposed on the rotor 100. Accordingly, the date-forwarding intermediate wheel 40, which is formed by the large-diameter member 4b and the small-diameter member 4a, rotates about the shaft 41 as a rotating shaft in conjunction with the rotation of the rotor 100.

As shown in FIG. 1, the date indicator 50 has a ring shape and has an internal gear 5a formed on the inner circumferential surface thereof. The date-forwarding wheel 60 has a gear having five teeth, which engages with the internal gear 5a. Also, as shown in FIG. 3, the date-forwarding wheel 60 has a shaft 61 disposed at the center thereof, which is loosely fitted into a through-hole 62 formed in the second bottom plate 103'. The through-hole 62 has an eyebrow shape extending in a direction along which the date indicator 50 rotates.

A leaf spring 63 is fixed to the bottom plate 103' at one end thereof and presses the shaft 61 by the other end thereof in an upper right direction in FIG. 1. Thus, the leaf spring 63 urges the shaft 61 and the date-forwarding wheel 60. This urging action of the leaf spring 63 restricts the swinging of the date indicator 50.

A leaf spring 64 is fixed to the bottom plate 103' at one end thereof by a screw and has a bent top 64a having an approximately V-shape and formed at the other end thereof. Also, a contact 65 is disposed so as to come into contact with the leaf spring 64 when the date-forwarding intermediate wheel 40 rotates and the top 64a falls in the notch 4c. Since the leaf spring 64 has a predetermined voltage applied thereon, when it comes into contact with the contact 65, the voltage is also applied on the contact 65. Therefore, by detecting the voltage of the contact 65, a date-forwarding state can be detected. Alternatively, a manual drive wheel (not shown) engaging with the internal gear 5a may be disposed so as to drive the date indicator 50 when a user performs a predetermined operation with a crown (not shown).

With this structure, the diaphragm 10 of the piezoelectric actuator A vibrates along a plane parallel to its surface, when a driving voltage is applied thereon from the drive circuit 500. The rotor 100 is hit on the outer circumferential surface thereof upon receiving a vibration produced in the diaphragm 10 and is driven to rotate clockwise as shown by an arrow in FIG. 1. The rotation of the rotor 100 is forwarded to the date-forwarding wheel 60 via the date-forwarding intermediate wheel 40, and the date-forwarding wheel 60 rotates the date indicator 50 in a clockwise direction.

C. Structure of Piezoelectric Actuator

Figure 4:
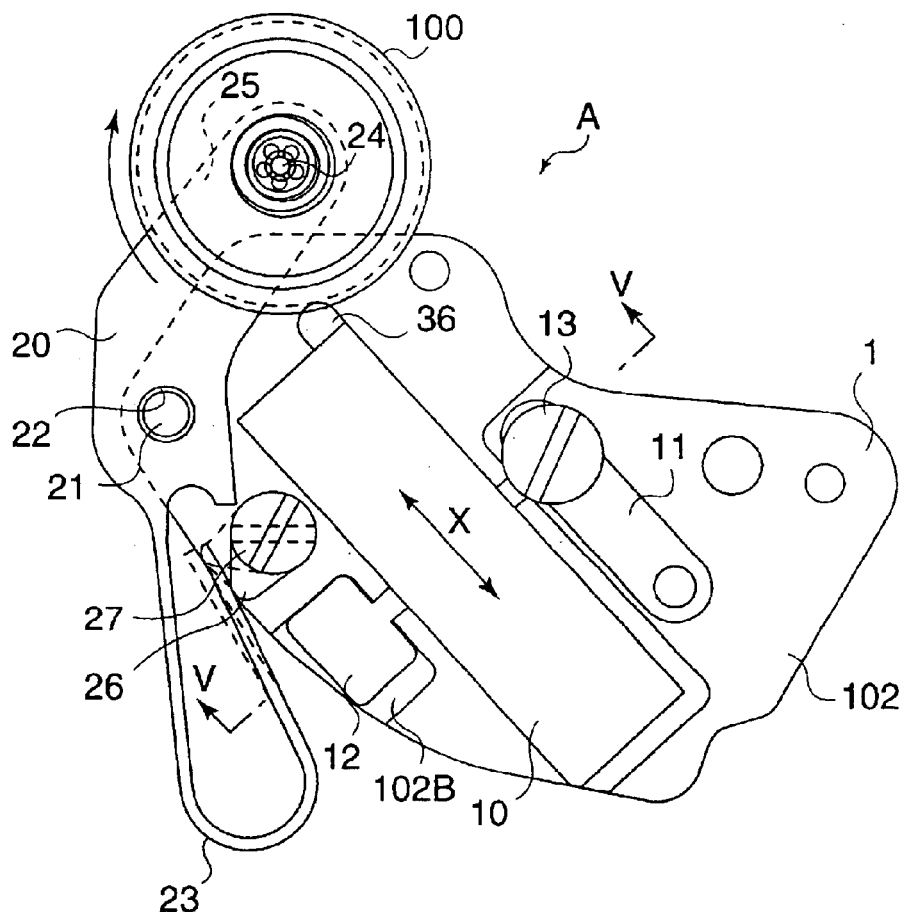
FIG. 4 is a plan view illustrating the structure of a piezoelectric actuator serving as a component of the calendar indicating mechanism according to the embodiment.
Figure 5:
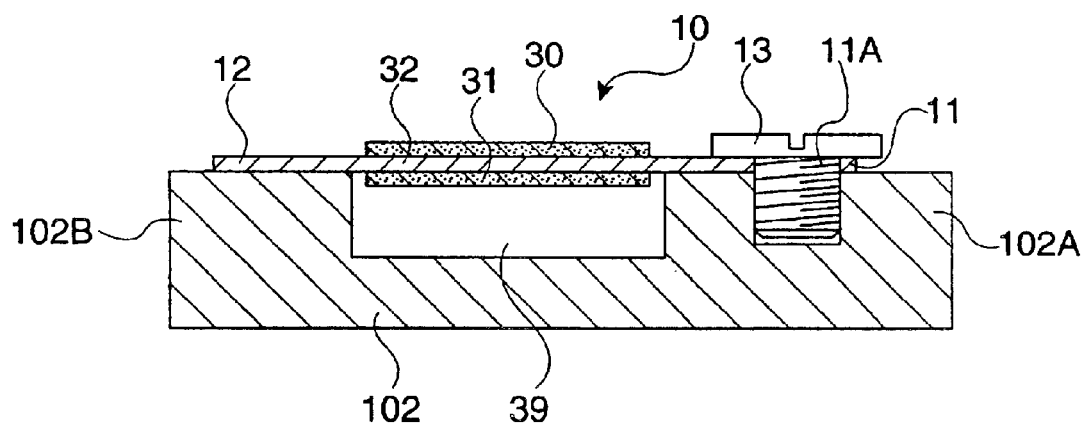
FIG. 5 is a sectional view viewed in the direction from the arrow v—v shown in FIG. 4.
Figure 6:
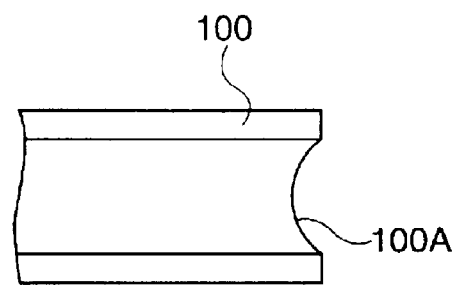
FIGS. 6 and 7 are side views of rotors according to the embodiment.
Figure 7:
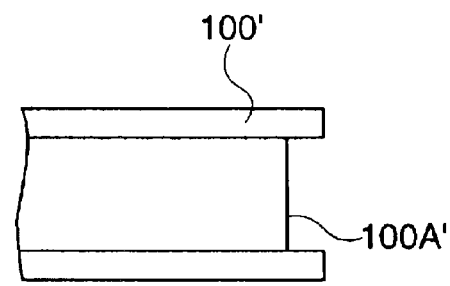
Figure 8:
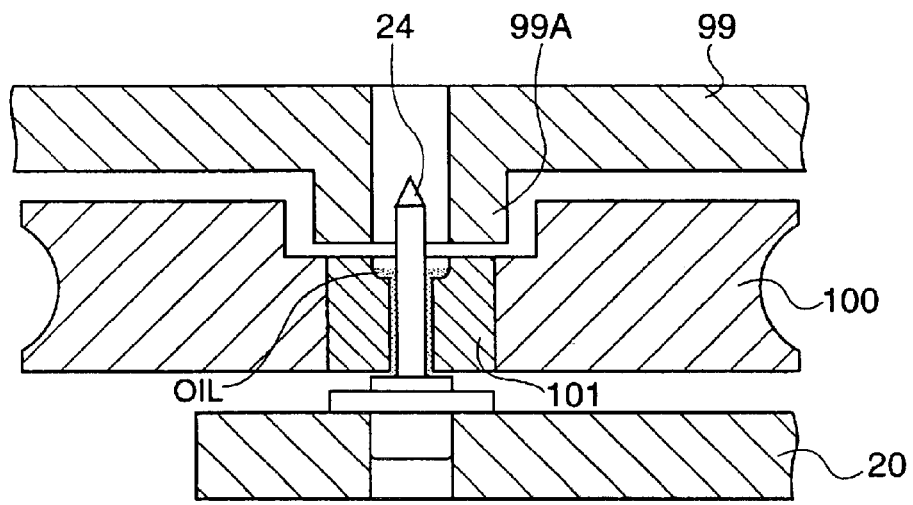
FIG. 8 is a sectional view illustrating a structure for supporting the rotor according to the embodiment.
Figure 9:
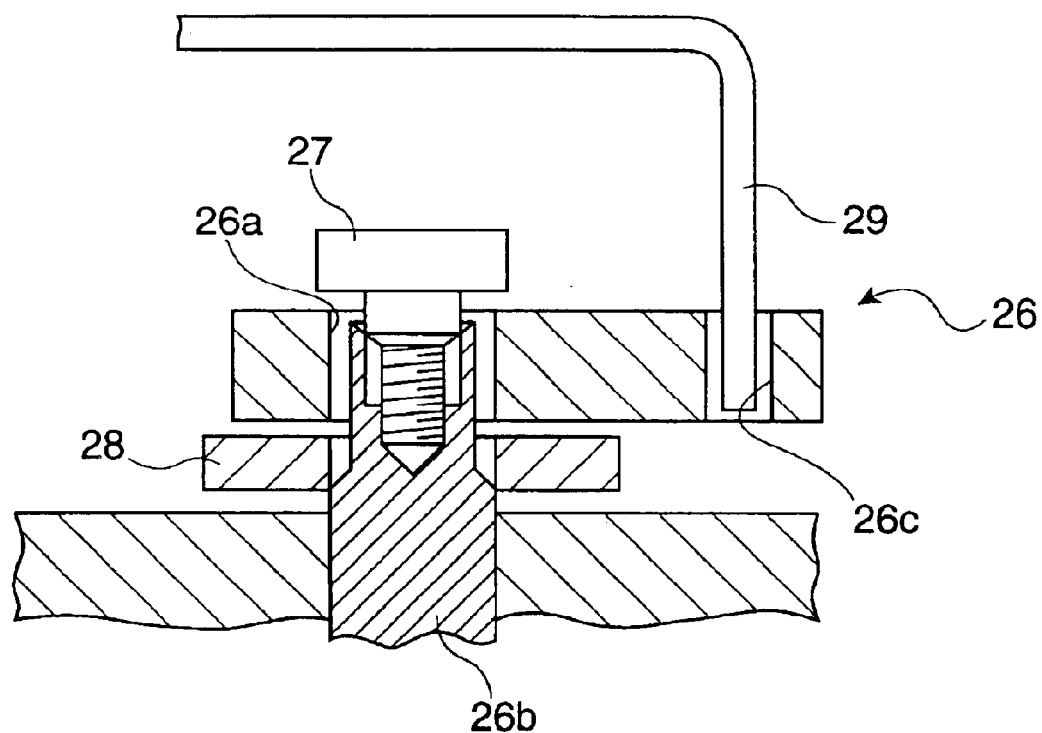
FIG. 9 is a sectional view illustrating a pressure-adjusting mechanism of the piezoelectric actuator according to the embodiment and its adjusting method.
Figure 10:
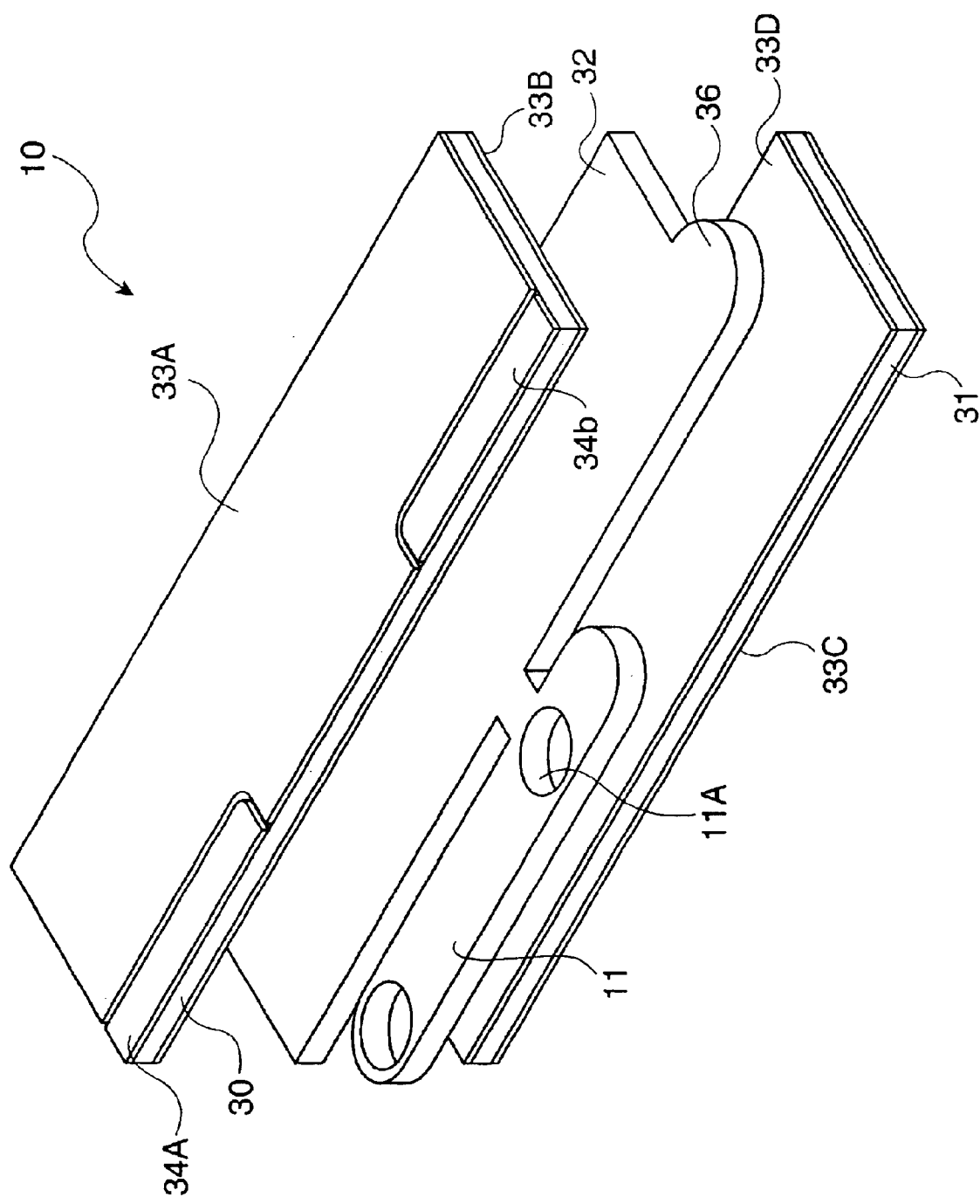
FIG. 10 is an exploded perspective view illustrating a diaphragm serving as a component of the piezoelectric actuator according to the embodiment.
Figure 11:
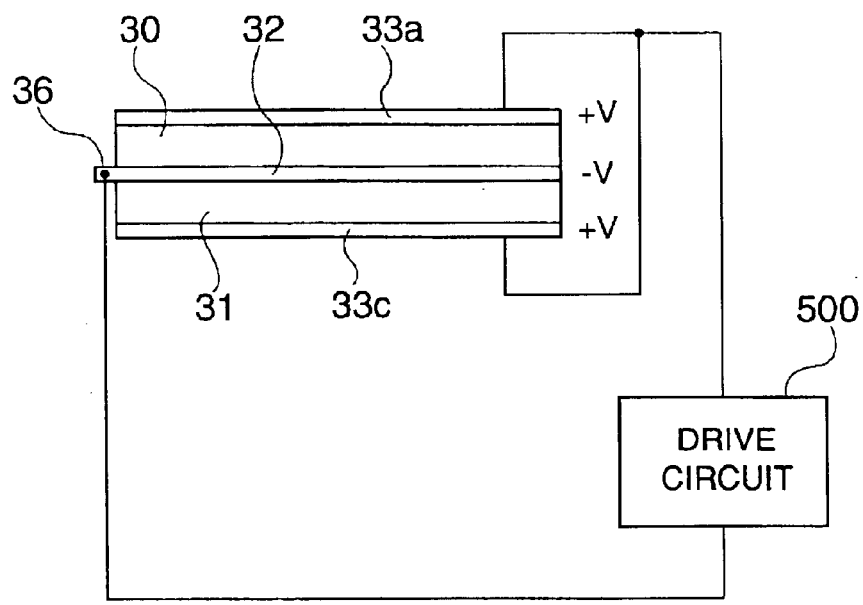
FIG. 11 is an illustration of a schematic driving configuration for feeding a drive signal to piezoelectric elements of the diaphragm according to the embodiment.
Figure 12:
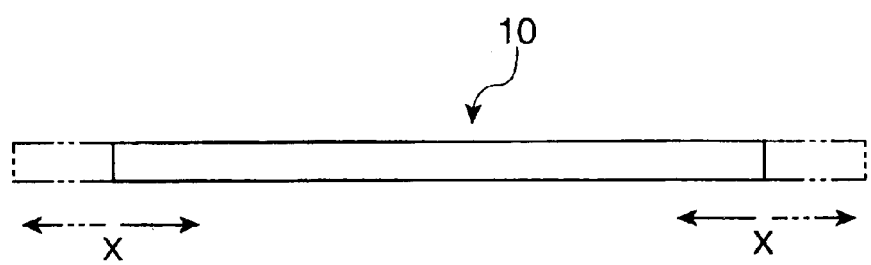
FIG. 12 is a schematic illustration of how the diaphragm according to the embodiment produces a longitudinal vibration.
Figure 13:
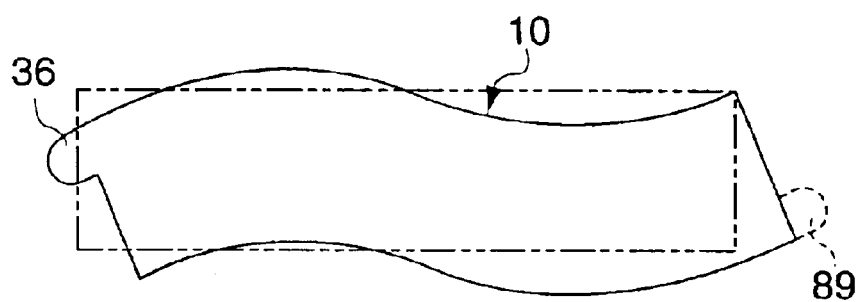
FIG. 13 is a schematic illustration of how the diaphragm according to the embodiment performs bending vibration.
Figure 14:
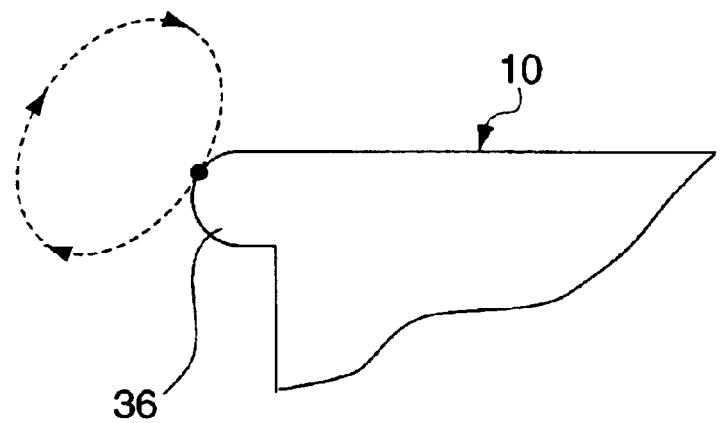
FIG. 14 is an illustration of an orbit of an abutment of the vibrating diaphragm according to the embodiment.
Figure 15:
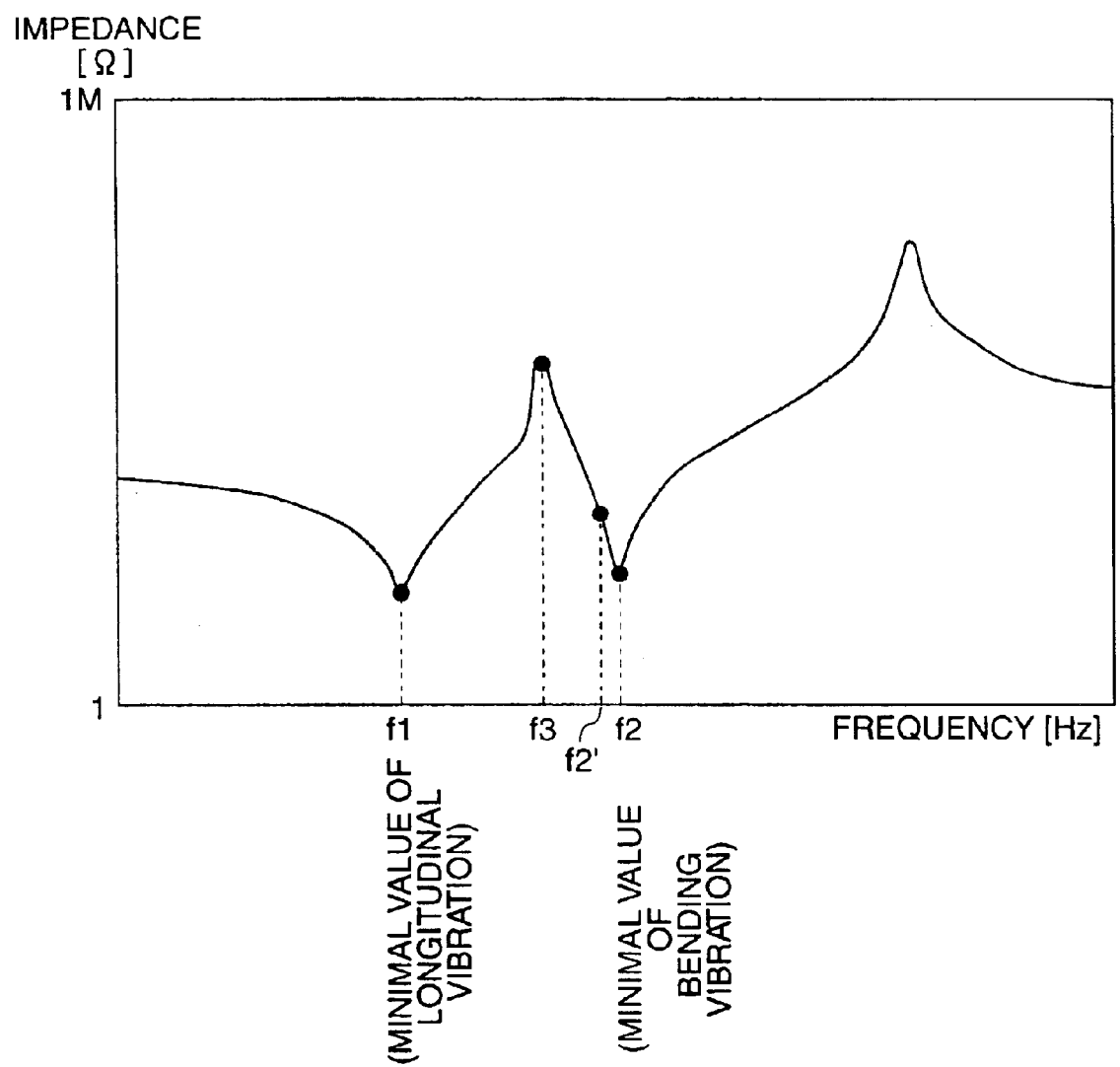
FIG. 15 is an illustration of an example relationship between oscillation frequency and impedance of the diaphragm.
Figure 16:
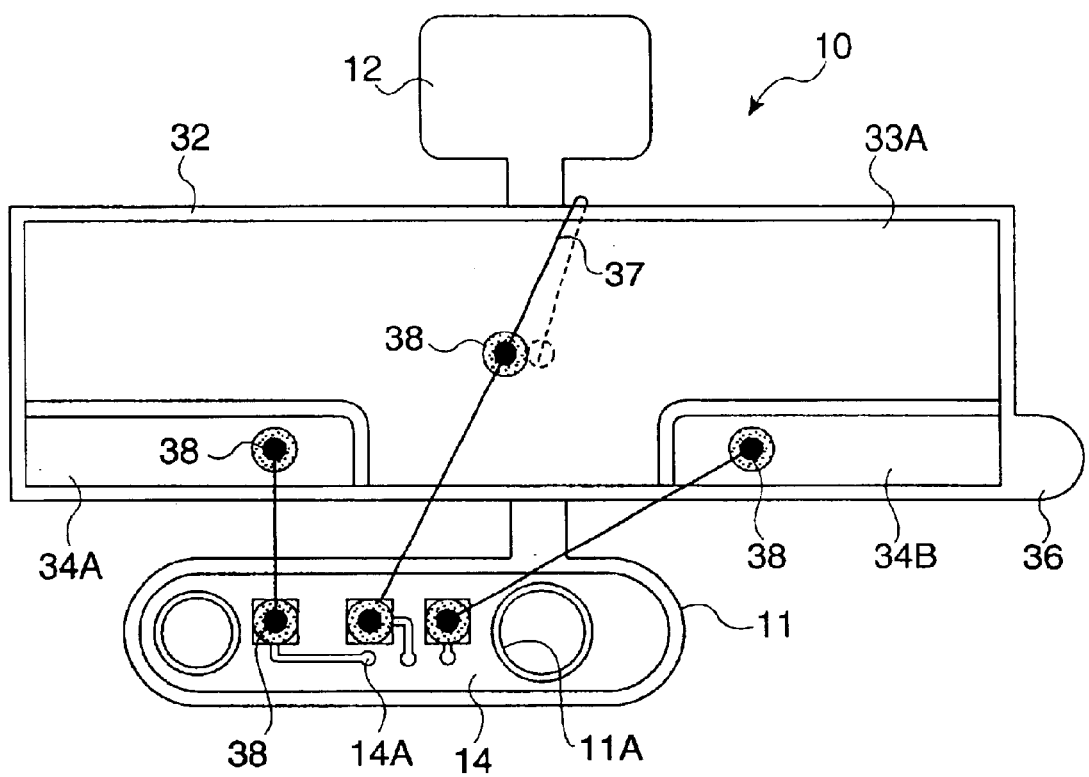
FIG. 16 is a plan view of the diaphragm according to the embodiment.

FIG. 4 is a plan view of the piezoelectric actuator A, FIG. 5 is a sectional view viewed from the arrow direction V—V shown in FIG. 4, FIGS. 6 and 7 are partially magnified views of the rotor 100, FIG. 8 is a sectional view illustrating a structure for supporting the rotor 100, FIG. 9 is a sectional view illustrating a method for adjusting a pressing force with a pressure-adjusting cam, FIG. 10 is an exploded perspective view illustrating the diaphragm 10, FIG. 11 is an illustration of a driving configuration for feeding drive signals to piezoelectric elements, FIGS. 12 to 14 are illustrations of how the diaphragm vibrates, FIG. 15 is an illustration of the relationship between oscillation frequency and impedance of the diaphragm 10, FIG. 16 is a plan view illustrating a state in which a bonding wire of the diaphragm 10 is connected, and FIGS. 17 to 20 illustrate the connection procedure of the bonding wire.

As shown in FIG. 4, the piezoelectric actuator A has the base plate 102 which is independent of the bottom plate 103, the diaphragm 10, a lever 20, a pressure-adjusting cam 26, and the rotor 100.

Although the base plate 102 of the piezoelectric actuator A according to this embodiment is disposed independent of the bottom plate 103, the piezoelectric actuator A may have a structure in which the base plate 102 is omitted and the bottom plate 103 has the diaphragm 10, the lever 20, the pressure-adjusting cam 26, and the rotor 100 disposed on a part thereof.

The rotor 100 of the piezoelectric actuator A has a bearing (not shown) therein, and a shaft 24 of the lever 20 supported by the base plate 102 is inserted into the bearing. The rotor 100 rotates about the shaft 24.

As shown in FIG. 4, the diaphragm 10 has a flat, strip shape. As shown in FIG. 10, the diaphragm 10 has a stacked structure in which two stripe-shaped piezoelectric elements 30 and 31 have a backing material 32 interposed therebetween. The backing material 32 has substantially the same strip shape as those of the piezoelectric elements 30 and 31 and is also made of a conductor, such as a stainless steel, having a thickness smaller than those of the piezoelectric elements 30 and 31. A fixing member 11 is formed at one of two long sides sandwiching the backing material 32. As shown in the figure, the fixing member 11 has a long shape extending parallel to the long sides of the backing material 32. Also, the fixing member 11 has a positioning hole 11A drilled therein.

As shown in FIGS. 4 and 5, by inserting a screw 13 into the positioning hole 11A and screwing it into a fixing-member projection 102A of the base plate 102, the diaphragm 10 is fixed to the fixing-member projection 102A. Also, as shown in FIG. 5, a support abutment member 12 extending out from the piezoelectric elements 30 and 31 is formed on the opposite side of the fixing member 11 with respect to the backing material 32 and is placed on a support-abutment projection 102B of the base plate 102.

As shown in FIG. 5, in the diaphragm 10, the fixing member 11 and the support abutment member 12 which protrude out from and on both sides of a portion of the backing material 32 sandwiched by the piezoelectric elements 30 and 31 are placed on the base plate 102. Meanwhile, in a state in which the diaphragm 10 is fixed to the base plate 102 by the fixing member 11 and the support abutment member 12, the backing material 32, having the piezoelectric elements 30 and 31 respectively disposed thereon and thereunder, and the base plate 102 have a space 39 formed therebetween. Although the support abutment member 12 is placed on the base plate 102, the fixing member 11 is firmly fixed to the base plate 102 by the screw 13.

The diaphragm 5 of the above-mentioned known piezoelectric actuator is supported in a state of having a degree of freedom so as to rotate about the pin 7a. Having such a degree of freedom, the known piezoelectric actuator has problems such as a low driving efficiency and an unstable driving characteristic.

As opposed to this, the piezoelectric actuator according to this embodiment is fixed to the base plate 102 in a state in which play (movable clearance) of the diaphragm 10 is eliminated. The diaphragm 10 vibrates with a driving voltage in a state in which it is completely positioned and fixed to the base plate 102. Accordingly, this embodiment prevents a reduction in the driving efficiency and instability of the driving characteristic, caused by the play (movable clearance) of the diaphragm.

Also, as shown in FIGS. 4 and 10, the backing material 32 has an abutment member 36 protruding therefrom. The abutment member 36 is pressed against the outer circumferential surface of the rotor 100. Although the abutment member 36 may be made of either a conductive material or a non-conductive material, when it is made of a non-conductive material, the base plate 102 is prevented from short circuiting with the piezoelectric elements 30 and 31 via the rotor 100 generally made of metal. In order prevent this short circuiting, the shaft 24 for rotatably supporting the rotor 100 may undergo an insulation treatment.

Also, the abutment member 36 has an arch shape protruding towards the rotor 100 in plan view. By forming the abutment member 36 abutting against the rotor 100 so as to have an arch shape as mentioned above, even when the positional relationship between the rotor 100 and the diaphragm 10 varies due to variations in dimension or the like, a part of the outer circumferential surface of the abutment member 36 having an arch shape abuts against the outer circumferential surface of the rotor 100 having a round shape while the same contact area therebetween is always kept. As a result, the stable contact between the rotor 100 and the abutment member 36 is maintained.

Furthermore, as shown in FIGS. 3 and 6, the rotor 100 has a concave groove 100A having an arch-shaped cross section formed on the outer circumferential surface thereof along the circumferential direction thereof. By arranging the abutment member 36 so as to abut against the groove bottom of the concave groove 100A, the rotor 100 is prevented from being disengaged. In addition, since the concave groove 100A has an arch-shaped (curved surface) cross section and the abutment member 36 coming into contact with the concave groove 100A also has an arch shape, the concave groove 100A and the abutment member 36 form a point of contact, whereby energy can be stably forwarded. Instead of the foregoing rotor, a rotor 100' may have an approximately horse-shoe-shaped cross section such as a recessed groove 100A', as shown in FIG. 7.

As shown in FIGS. 3 and 4, the lever 20 has an insertion hole 22 formed halfway through an arm thereof extending in its longitudinal direction, and a shaft 21 disposed on the base plate 102 in a standing manner is inserted into the insertion hole 22. By inserting the shaft 21 into the insertion hole 22 as described above, the lever 20 is turnably supported with respect to the base plate 102. Also, the lever 20 has an approximately U-shaped spring member 23 formed at one end thereof. In addition, the lever 20 has a rotor-fixing member 25 having the shaft 24 disposed at the other end thereof so that the rotor 100 is rotatably supported by the shaft 24 so as to rotate about its own axis.

Furthermore, the fixing structure of the rotor 100 to the shaft 24 will be described in detail with reference to FIG. 8.

Since the movement 73 placed under the dial 70 in general has a bottom plate 20 and a pressure plate 99, each member of the movement 73 is fixed while being pressed against the bottom plate 20 by the pressure plate 99. With this arrangement, an annular projection 99A of the pressure plate 99 prevents the rotor 100 rotatably supported by the shaft 24 of the lever 20 from coming off.

Also, as described above, since the rotor 100 presses the abutment member 36 of the diaphragm 10, the bearing of the rotor 100 is required to have necessary durability and strength. To achieve this, a bearing 101 composed of a ruby material having a high abrasion resistance is used.

By applying oil between the bearing 101 and the shaft 24, the abrasion resistance can be further improved. The foregoing bearing is not limited to the bearing 101; but any bearing will work as long as it has a high abrasion resistance (for example, a bearing bearing). Also, upper and lower gaps of the rotor 100 in the vertical direction are determined by the annular projection 99A of the pressure plate 99 and by a step of the shaft 24, respectively. In addition, an axial gap of the rotor 100 is determined at its portion having a relatively small diameter, that is, at the bearing 101. With this arrangement, a load torque exerted on the rotor 100 becomes smaller.

Referring back to FIG. 4, the pressure-adjusting cam 26 is pressed against the top of the spring member 23. As shown in FIG. 9, the pressure-adjusting cam 26 has a through-hole 26A; a screw-engaging member 26B disposed on the base plate 102 in a standing manner is fitted into the through-hole 26A; and the screw-engaging member 26B has a screw thread carved therein so as to be screwed together with a screw 27.

The pressure-adjusting cam 26 and the base plate 102 have a spacer 28 interposed therebetween, and by fastening the screw 27, the pressure-adjusting cam 26 is fixed to the base plate 102 in a state in which turning is restricted.

When the screw 27 is unfastened in this state, the pressure-adjusting cam 26 becomes turnable about the screw 27. In this state, the turning of the pressure-adjusting cam 26 can be easily adjusted by an adjusting worker when the worker inserts an approximately L-shaped adjusting terminal 29 into a terminal guiding-hole 26C drilled in the pressure-adjusting cam 26 and moves the adjusting terminal 29 by hand.

As shown in FIG. 4, due to a pressing force of the pressure-adjusting cam 26 against the spring member 23, the distance between two U-shaped legs of the spring member 23 becomes narrower. An elastic force produced in the spring member 23 in this state causes the rotor-fixing member 25 to rotate about the shaft 21 in a clockwise direction. With this arrangement, the outer circumferential surface of the rotor 100 fixed to the rotor-fixing member 25 is pressed against the abutment member 36.

According to such a structure, a pressing force applied on the diaphragm 10 can be adjusted by adjusting the pressure-adjusting cam 26. When the spring member 23 is deformed by turning the pressure-adjusting cam 26 to a large extent as shown by a dotted line in FIG. 4, the rotor-fixing member 25 moves about the shaft 21 in a clockwise direction in the figure against the elastic force of the spring member 23, whereby a pressing force of the rotor 100 applied on the diaphragm 10 increases. Also, when the distance between the two legs of the spring member 23 becomes wider as shown by a solid line in the figure by adjusting the pressure-adjusting cam 26, the elastic force of the spring member 23 decreases, whereby the pressing force of the rotor 100 applied on the diaphragm 10 decreases.

Instead of the above-mentioned way of adjustment, the pressure-adjusting cam 26 can be adjusted by hand or by an automatic assembling machine which automatically assembles a movement of a timepiece.

Referring next to FIG. 10, the diaphragm 10 will be described.

As already described above, the diaphragm 10 has a stacked structure in which the piezoelectric elements 30 and 31 have the plate-like backing material 32 interposed therebetween. This structure reduces damage to the diaphragm 10 caused by an external shock such as a vibration having an excessive amplitude or a drop and improves the durability thereof. Also, the backing material 32 having a thickness smaller than those of the piezoelectric elements 30 and 31 is used so as not to disturb vibrations of the piezoelectric elements 30 and 31 as much as possible. Since the foregoing fixing member 11, support abutment member 12, and abutment member 36 are integrally formed with the backing material 32, the manufacturing process thereof can be simplified.

Also, the piezoelectric element 30 disposed on the backing material 32 has stripe-shaped power-supplying electrode plates 33A and 33B bonded on the upper and lower surfaces thereof, respectively, so as to cover substantially the whole surface of the piezoelectric element 30. Likewise, the piezoelectric element 31 disposed under the backing material 32 has stripe-shaped power-supplying electrode plates 33C and 33D bonded on the upper and lower surfaces thereof, respectively, so as to cover substantially the whole surface of the piezoelectric element 31. The power-supplying electrode plate 33A has regions in the vicinities of respective vertices lying at both ends of one long side thereof so that the regions are formed by cutting so as to be electrically insulated from each other. Thus, the two isolated portions which are separated from the power-supplying electrode plate 33A in the sense of insulation become detecting electrode plates 34A and 34B for detecting a vibrating state of the diaphragm 10.

The piezoelectric elements 30 and 31 may be composed of a variety of materials including lead zirconate titanate (PZT (trademark)), quartz crystal, lithium niobate, barium titanate, lead titanate, lead metaniobate, poly(vinylidene fluoride), lead zinc niobate, and lead scandium niobate. The composition formula of lead zinc niobate is expressed by $[Pb(Zn_{1/3}—Nb_{2/3})O_3]_{1-X}(PbTiO_3)_X]$, (where X is about 0.09 although it varies depending on the composition), and the composition formula of the lead scandium niobate is expressed by $[Pb((Sc_{1/2}—Nb_{1/2})_{1-X}Ti_X)O_3]$, (where X is about 0.09 although it varies depending on the composition).

In the case where polarization directions of the piezoelectric element 30 and the piezoelectric element 31 are opposite to each other, when alternating drive signals are fed from the drive circuit 500 so that the upper surface, the center, and the lower surface are respectively at electric potentials of +V, −V, and +V (or −V, +V, and −V), for example, as shown in FIG. 11, the plate-like piezoelectric elements move in an expanding and contracting manner. In this embodiment, the move due to such expansion and contraction is utilized. The alternating drive signals for +V and −V are in opposite phase with each other. With this arrangement, the amplitude of vibrations produced in the upper piezoelectric element 30 and the lower piezoelectric element 31 can be made larger than that in the backing material 32, compared to the case where zero volts are applied on the backing material 32 (that is, the backing material 32 is connected to an earth of the drive circuit 500). Also, the base plate 102 is composed of an insulating material such as a resin material so as to prevent the diaphragm 10 from being at a grounding potential. In addition, when the base plate 102 is composed of a conductor, the base plate 102 and the fixing member 11 may have an insulating plate sandwiched therebetween. Since the backing material 32 is composed of a conductor, the power-supplying electrode plates 31B and 33D contacting the piezoelectric elements 30 and 31 can be eliminated, whereby the illustration thereof is omitted in FIG. 11.

In the diaphragm 10 having such a structure, when an alternating drive signals are fed to the piezoelectric elements 30 and 31 from the drive circuit 500 via the power-supplying electrode plates 33A to 33D, the piezoelectric elements 30 and 31 have vibrations produced therein which expand and contract in the longitudinal direction thereof. In this state, as shown by the arrows X in FIGS. 4 and 12, the piezoelectric elements 30 and 31 produce longitudinal vibrations which expand and contract in the longitudinal direction thereof.

When the diaphragm 10 is excited with an electric longitudinal vibration by feeding the drive signals to the piezoelectric elements 30 and 31 as described above, an imbalance of the weight distribution of the diaphragm 10 causes to produce a rotation moment about the center of gravity of the diaphragm 10. This rotation moment causes to induce a bending vibration by which the diaphragm 10 oscillates in its width direction, as shown in FIG. 13. Also, the diaphragm 10 may have a structure in which a balancer 98 is disposed on the end thereof lying on the opposite side of the other end on which the abutment member 36 is disposed so as to induce a larger bending vibration and thus to produce a larger rotation moment.

More particularly, when the diaphragm 10 produces a longitudinal vibration (refer to FIG. 12), a rotation moment is acted thereon about its fulcrum (the center of gravity in the case of no load), and a bending vibration is induced in the diaphragm 10 (refer to FIG. 13). When such a longitudinal vibration and a bending vibration are produced and these two are coupled with each other, the contact portion of the abutment member 36 of the diaphragm 10 with the outer circumferential surface of the rotor 100 turns clockwise along an elliptic orbit, as shown in FIG. 14. In other words, the contact portion of the abutment member 36 with the rotor 100 moves to a large extent.

Although a vibration of the longitudinal vibration coupled with the bending vibration is produced in the diaphragm 10, as described above, dominance of a longitudinal vibration mode or a bending vibration mode depends on a frequency of drive signals fed to the piezoelectric elements 30 and 31. FIG. 15 is an illustration of an example relationship between oscillation frequency and impedance of the diaphragm 10. As shown in the figure, resonant frequencies f1 and f2 respectively providing minimal impedance values of the longitudinal vibration mode and the bending vibration mode are different from each other. Accordingly, when the piezoelectric elements 30 and 31 are driven at a frequency f2' between a frequency f3, which lies between the resonant frequency f1 and the resonant frequency f2 and provides a maximal impedance value, and the resonant frequency f2 of the bending vibration mode, the piezoelectric elements 30 and 31 produce longitudinal vibrations and also have bending vibrations induced therein. In addition, since the piezoelectric elements 30 and 31 are driven at the frequency f2' close to the resonant frequency f2 of the bending vibration mode, they have large bending vibrations induced therein, thereby causing the abutment member 36 of the diaphragm 10 to vibrate along a larger elliptic orbit. Since the elliptic orbit along which the abutment member 36 turns becomes larger as mentioned above, a rotation force of the abutment member 36 exerted on the rotor 100 becomes larger, thereby leading to a higher driving efficiency. Here, the driving efficiency is defined by a workload per unit of time (i.e., the number of rotations×load torque) of the rotor 100 with respect to an amount of electric energy fed to the piezoelectric elements 30 and 31.

As described above, since the abutment member 36 turns clockwise along an elliptic orbit, when the abutment member 36 lies at a position protruding towards the rotor 100, a pressing force of the abutment member 36 pressing the rotor 100 is large, and when the abutment member 36 lies at a position retracting from the rotor 100, the pressing force of the abutment member 36 pressing the rotor 100 is small. Accordingly, when the pressing force between these two components is large, that is, when the abutment member 36 lies at the position protruding towards the rotor 100, the piezoelectric actuator A drives the rotor 100 to turn in the moving direction of the abutment member 36.

Next, wiring of wire lines of the piezoelectric elements 30 and 31 and the manufacturing method thereof will be described.

As shown in FIG. 16, the diaphragm 10 has a lead board 14 bonded on the fixing member 11, and the lead board 14, the power-supplying electrode plates 33A and 33C, and the detecting electrode plates 34A and 34B are connected by a bonding wire 37. The bonding wire 37 used in this case is an electrical wire such as an enameled wire or a polyurethane wire (for example, a polyurethane enamel copper wire made by Sumitomo Electric Industries, Ltd.) wire which can be directly soldered, for example, without removing its coating. The connecting method is not limited to soldering; but resistance welding or the like can be also applied.

In addition, portions of the bonding wire 37 which are connected with the power-supplying electrode plates 33A and 33C, the detecting electrode plates 34A and 34B, and lands 14A of the lead board 14 are covered by potting layers 38 composed of an insulating resin or the like.

Since the same drive signals are fed to the power-supplying electrode plates 33A and 33C respectively formed on the front and rear surfaces of the diaphragm 10, the bonding wire 37 connects the power-supplying electrode plate 33C lying on the rear surface, the power-supplying electrode plate 33A lying on the front surface, and the corresponding land 14A of the lead board 14, in addition to connecting the detecting electrode plates 34A and 34B and the land 14A of the lead board 14. Although the bonding wire 37 gets around the side edge of the diaphragm 10 in order to extend from the rear surface to the front surface of the diaphragm 10, since the bonding wire 37 is coated, it is electrically insulated from the piezoelectric elements 30 and 31, and the like, even when it comes into contact with the side edge thereof.

Next, the connecting method of the bonding wire 37 will be described, with reference to FIGS. 17 to 20.

Figure 17:
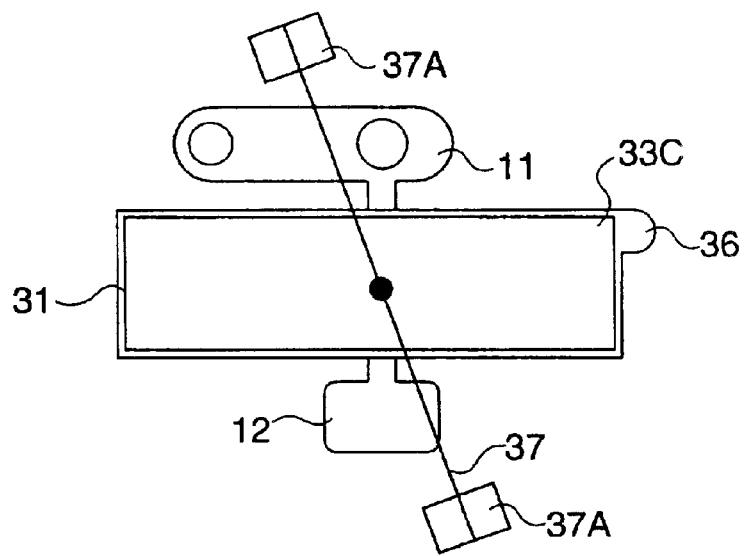
FIGS. 17 to 20 illustrate the connection procedure of a bonding wire of the diaphragm according to the embodiment.

First, after the piezoelectric element 30, having the power-supplying electrode plates 33A and 33B stacked on both surfaces thereof, and the piezoelectric element 31, having the power-supplying electrode plates 33C and 33D stacked on both surfaces thereof, are stacked on the front and rear of the backing material 32, as shown in FIG. 17, two bobbins 37A are disposed on both sides of the power-supplying electrode plate 33C lying on the rear surface (the surface on which the lead board 14 is not bonded) so as to extend the bonding wire 37 across the power-supplying electrode plate 33C. Then, the bonding wire 37 is connected to the power-supplying electrode plate 33C by ultrasonic soldering (First bonding step).

Figure 18:
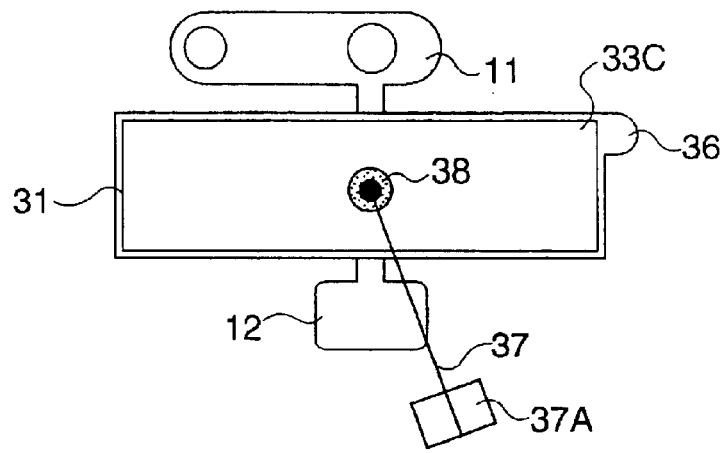

As shown in FIG. 18, after the potting layer 38 is formed such that the portion of the bonding wire connected by soldering is covered with an insulating resin, one part of the bonding wire 37 (close to the fixing member 11) is cut off (First potting step).

Figure 19:
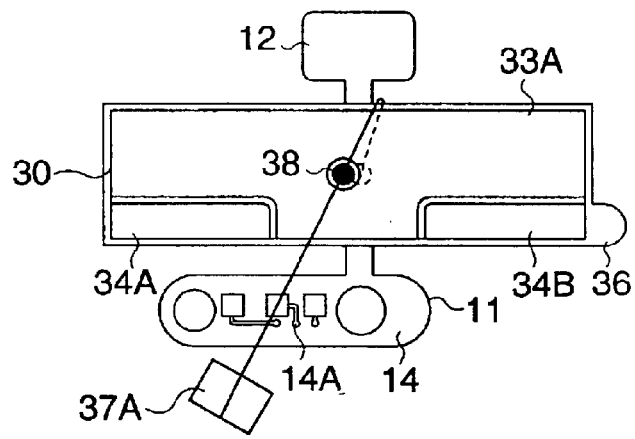

Then, after the diaphragm 10 is turned upside down and the bonding wire 37 is extended to the rear surface by getting around the side edge of the diaphragm 10, the bobbin 37A lying close to the other part of the bonding wire 37 is disposed so as to extend the bonding wire 37 across the power-supplying electrode plate 33A lying on the front surface. In this stage, as shown in FIG. 19, the bobbin 37A is disposed such that the bonding wire 37 extends across the land 14A of the lead board 14. Then, the bonding wire 37 is connected to the power-supplying electrode plate 33A by soldering (Second bonding step).

The other potting layer is formed such that the other portion of the bonding wire 37 connected by the second bonding step is covered with an insulating resin in a similar fashion to that in the first potting step (Second potting step).

Figure 20:
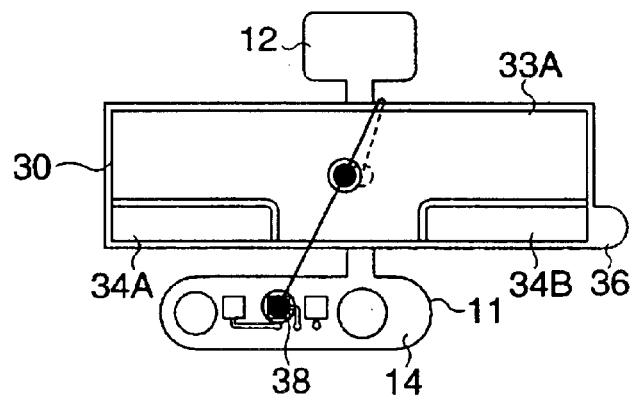

Then, as shown in FIG. 20, the bonding wire 37 is soldered to the land 14A of the lead board 14 (Third bonding step).

After the other potting layer 38 is formed such that the other portion of the bonding wire connected by the third step is covered with an insulating resin, the bonding wire 37 is cut off (Third potting step).

Since the portions of the bonding wire 37 connected with the power-supplying electrode plates 33A and 33C are covered by the potting layers 38 as described above, a risk of detachment of the connected portions due to a shock or a vibration can be reduced and also these portions are protected from moisture or corrosion.

D. Drive Circuit of Piezoelectric Actuator

Figure 21:
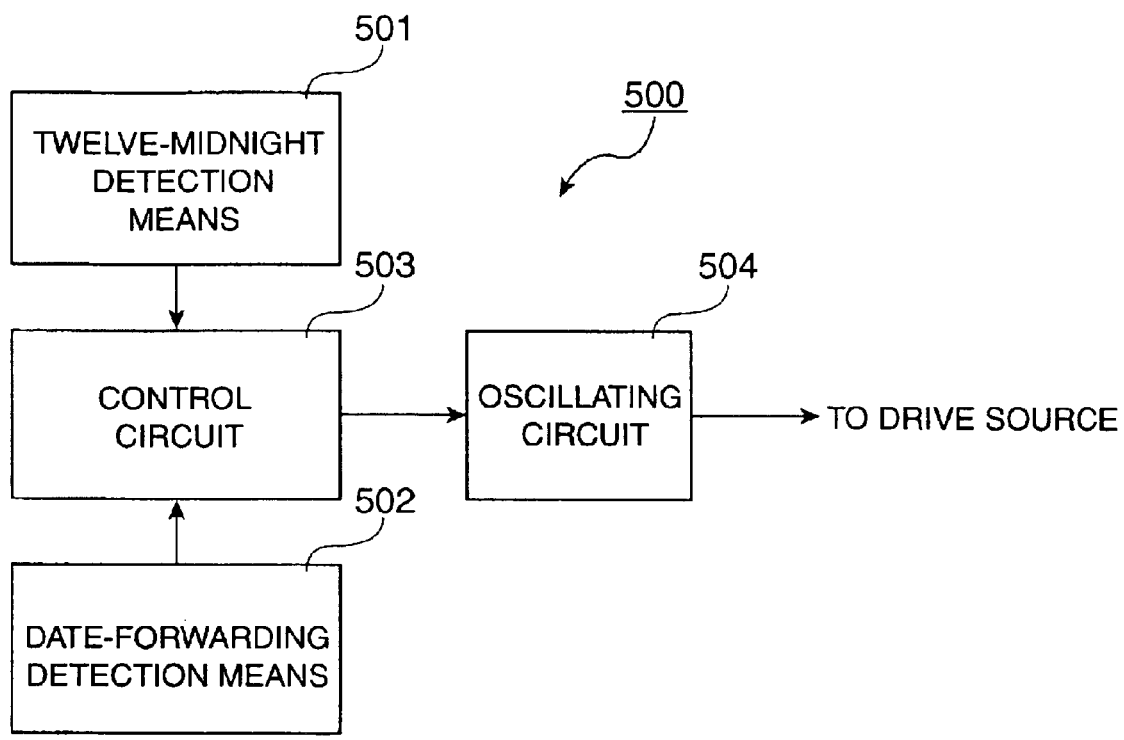
FIG. 21 is an illustration of the configuration of a drive circuit for feeding a drive signal to the piezoelectric actuator according to the embodiment.

Referring now to FIG. 21, the drive circuit used for the calendar indicating mechanism of the watch having the foregoing structure will be described.

As shown in the figure, the drive circuit 500 has twelve-midnight detection means 501, a control circuit 503, date-forwarding detection means 502, and an oscillation circuit 504. The twelve-midnight detection means 501 is a mechanical switch incorporated into the movement 73 (refer to FIG. 2) and outputs a control signal to the control circuit 503 at twelve midnight. The date-forwarding detection means 502 is mainly formed by the foregoing leaf spring 64 and contact 65 (refer to FIG. 1) and outputs a control signal to the control circuit 503 when the leaf spring 64 comes into contact with the contact 65, that is, when completion of date-forwarding is detected.

The control circuit 503 outputs an oscillation control signal to the oscillation circuit 504 on the basis of control signals fed by the twelve-midnight detection means 501 and the date-forwarding detection means 502. The oscillation control signal rises from a low level to a high level when the twelve-midnight detection means 501 detects a time of twelve midnight and then falls from the high level to the low level when the date-forwarding detection means 502 detects the completion of date forwarding.

Since the oscillation circuit 504 is activated for receiving power when the oscillation control signal is at the high level and is deactivated for receiving power when it is at the low level, drive signals with a predetermined frequency are fed to the piezoelectric elements 30 and 31 via the power-supplying electrode plates 33A to 33D when the oscillation control signal is at the high level. Upon receiving the drive signals, the piezoelectric elements 30 and 31 move in an expansion and contraction manner as mentioned above.

As described above, although the date-forwarding intermediate wheel 40 makes one rotation when a date is changed, its rotation is achieved for the limited time period at twelve midnight. Therefore, the oscillation circuit 504 will suffice as long as it oscillates during the foregoing time period. In this example drive circuit 500, since the power feed to the oscillation circuit 504 is controlled by the oscillation control signal either at the high level or the low level, an operation of the oscillation circuit 504 is completely stopped during the time period where the date-forwarding intermediate wheel 40 is not required to turn. As a result, unproductive power consumption by the oscillation circuit 504 can be reduced.

Although one notch 4c is formed on the circumferential surface of the small-diameter member 4a of the date-forwarding intermediate wheel 40 in this embodiment, when a plurality of notches (for example four notches) are formed, the calendar intermediate wheel 40 may make a quarter of rotation upon changing a date.

E. Operation of Calendar Indicating Mechanism

An automatic updating operation of the calendar indicating mechanism having the above-described structure and including the piezoelectric actuator A will be described with reference to FIGS. 1 and 21.

When it comes to twelve midnight every day, the time of twelve midnight is detected by the twelve-midnight detection means 501 shown in FIG. 21, and an oscillation control signal is output from the control circuit 503 to the oscillation circuit 504. Thus, drive signals with a predetermined frequency are fed from the oscillation circuit 504 to the piezoelectric elements 30 and 31 via the power-supplying electrode plates 33A to 33D.

When the drive signals from the drive circuit 500 are fed to the power-supplying electrode plates 33A to 33D, the piezoelectric elements 30 and 31 produces a deforming vibration due to its expansion and contraction, and the diaphragm 10 produces a longitudinal vibration.

In this state, when the polarization directions of the piezoelectric elements 30 and 31 are set so as to be opposite to each other as described above, the alternating drive signals are fed from the drive circuit 500 so as to provide the upper surface, the center, and the lower surface with electric potentials of +V, -V, and +V (or -V, +V, and -V), respectively.

When the diaphragm 10 is electrically excited in the vertical direction, a mechanical bending vibration is induced due to imbalance of the weight distribution of the diaphragm 10. Since the longitudinal vibration and the bending vibration are combined, the abutment member 36 vibrates along an elliptic orbit so as to drive the rotor 100.

Since the diaphragm 10 of the piezoelectric actuator A is driven by the drive circuit 500 as described above, the rotor 100 shown in FIG. 1 rotates in a clockwise direction in FIG. 1, and the date-forwarding intermediate wheel 40 accordingly starts to rotate in a counterclockwise direction.

Here, the drive circuit 500 is configured so as to stop the feeding of the drive signals when the leaf spring 64 and the contact 65 shown in FIG. 1 come into contact with each other. The top 64a lies in the notch 4c in a state in which the leaf spring 64 and the contact 65 are in contact with each other. Accordingly, the date-forwarding intermediate wheel 40 starts to rotate from the above-mentioned state.

Since the date-forwarding wheel 60 is urged by the leaf spring 63 in a clockwise direction, the small-diameter member 4a rotates while sliding on teeth 6a and 6b of the date-forwarding wheel 60. During the rotation of the small-diameter member, when the notch 4c reaches the position at which the tooth 6a of the date-forwarding wheel 60 lies, the tooth 6a engages with the notch 4c.

When the date-forwarding intermediate wheel 40 turns further in a counterclockwise direction, the date-forwarding wheel 60 turns by an amount of one tooth thereof, that is, "one fifth of a round", in conjunction with the date-forwarding intermediate wheel 40. In addition, in conjunction with this turning, the date indicator 50 is turned by an amount of one tooth thereof (corresponding to a dating range of one day) in a clockwise direction. On the final day of a month having less than "31" days, the above operation is repeated a plurality of times so that a correct date according to the calendar is indicated by the date indicator 50.

When the date-forwarding intermediate wheel 40 turns further in a counterclockwise direction and the notch 4c reaches the position at which the top 64a of the leaf spring 64 lies, the top 64a falls in the notch 4c. Then, the leaf spring 64 and the contact 65 come into contact with each other, the feeding of the drive signals is finished, and the date-forwarding intermediate wheel 40 comes to a stop of its rotation. Accordingly, the date-forwarding intermediate wheel 40 makes one rotation a day.

F. Procedure of Adjusting the Magnitude of Pressing Force

Next, the procedure of adjusting the magnitude of a pressing force, which is produced by turning the pressure-adjusting cam 26 so as to press the rotor 100 against the diaphragm 10, will be described.

In an assembling step of the movement of the watch, an adjusting worker sets the movement equipped with the piezoelectric actuator A on a not-shown rotation-number sensor for detecting the number of rotations of the rotor 100. The desirable rotation-number sensor is, for example, a laser displacement gauge which detects the number of rotations of an object without contacting it. Also, since the detecting electrode plates 34 can detect a vibration of the diaphragm 10, it may monitor detection signals output from the detecting electrode plates 34 at the same time.

Then, the adjusting worker performs a predetermined operation so as to shift the drive circuit 500 to an adjusting mode. In accordance with this shift, an oscillation control signal is output from the control circuit 503 to the oscillation circuit 504, and drive signals with a predetermined frequency are fed from the oscillation circuit 504 to the piezoelectric elements 30 and 31 via the power-supplying electrode plates 33A to 33D. As a result, the diaphragm 10 vibrates and the rotor 100 starts drive in accordance with the move of the abutment member 36.

Then, the adjusting worker unfastens the screw 27 with a screw driver and inserts the adjusting terminal 29 into the terminal-guiding hole 26C in this state so as to gradually make the pressure-adjusting cam 26 turn.

In this stage, while monitoring a detected value of the rotation-number sensor with a not-shown monitor or the like, the adjusting worker turns the pressure-adjusting cam 26 by at least one turn and then adjusts the direction of the pressure-adjusting cam 26 such that the rotation-number sensor provides the maximum detected value.

When the foregoing direction is determined, the adjusting worker fastens the screw 27 so as to fix the pressure-adjusting cam 26 to the base plate 102.

Other than the above-described manual adjustment, the pressing force can be adjusted by an automatic assembling machine which automatically assembles a movement of a timepiece.

G. Adjustment of Pressing Direction

Although the adjusting worker can adjust the magnitude of a pressing force in the above-mentioned manner, a direction in which the pressing force is exerted is also an important factor from the view point of improving a driving efficiency of the rotor 100.

Taking three different pressing directions as examples, adjustment of a pressing direction will be described as below. Although a spring member is omitted in figures which will be now referred to, it may be disposed as a part of the lever for supporting the rotor 100 as in the foregoing embodiment or independently, or instead of this structure, a pressing force may be produced in the diaphragm only in accordance with a pressing force of the rotor produced when the lever is fixed.

Figure 22:
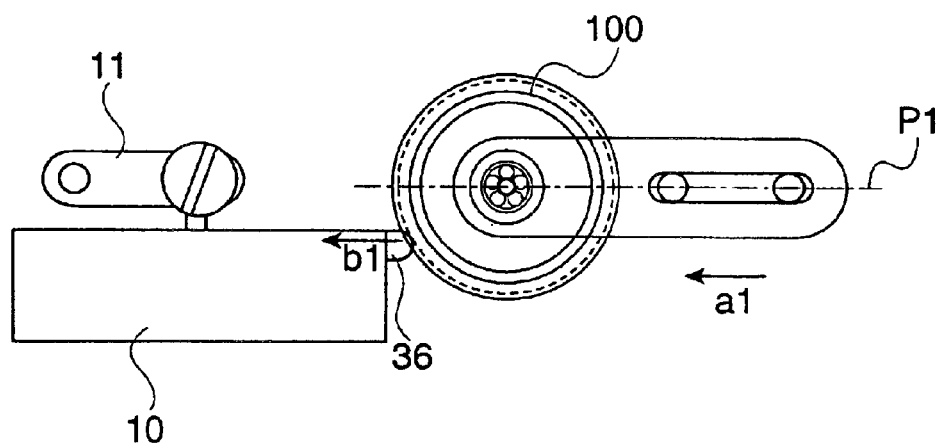
FIG. 22 is a plan view illustrating the positional relationship between the diaphragm and the rotor when a pressing force is applied in a direction parallel to a vibration direction of the diaphragm in this embodiment.

FIG. 22 is a plan view illustrating the positional relationship between the rotor 100 and the diaphragm 10 in the case that a direction of the pressing force of the rotor 100 applied on the diaphragm 10 is at zero degree.

The straight line P1 shown by a two-dotted-chain line in the figure indicates a moving direction of the rotor 100. The straight line P1 is substantially parallel to a vibration direction of the diaphragm 10. When a force is applied on the rotor 100 in the arrow a direction, the pressing force is exerted on the abutment member 36 in the arrow b direction.

Figure 23:
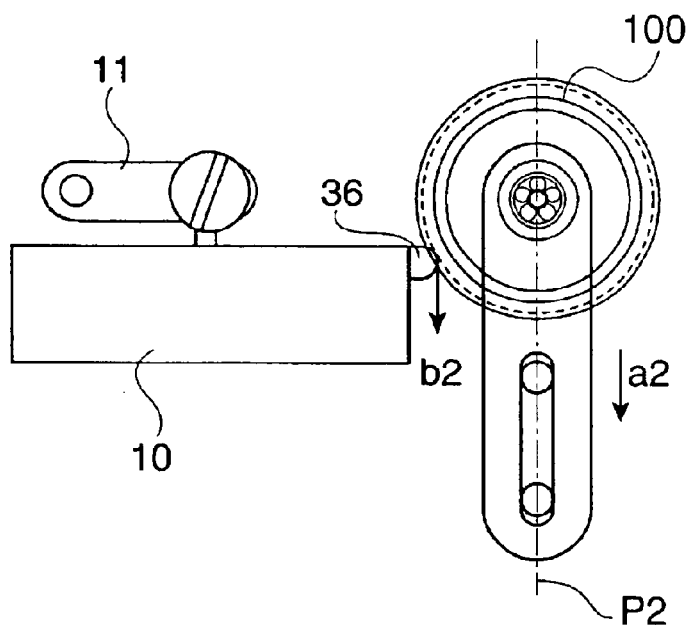
FIGS. 23 and 24 are plan views illustrating the positional relationship between the diaphragm and the rotor when a pressing force is applied in a direction orthogonal to the vibration direction of the diaphragm in this embodiment.
Figure 24:
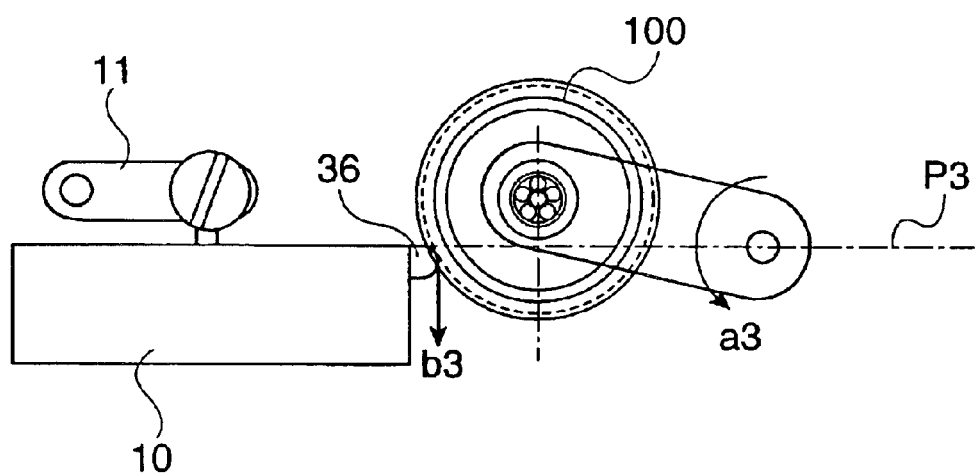

FIGS. 23 and 24 are plan views illustrating the positional relationship between the rotor 100 and the diaphragm 10 in the case that a direction of the pressing force of the rotor 100 applied on the diaphragm 10 is at 90 degrees.

The straight line P2 shown by a two-dotted-line in FIG. 23 indicates a moving direction of the rotor 100. The straight line P2 is substantially orthogonal to the vibration direction of the diaphragm 10. When a force is applied on the rotor 100 in the arrow a2 direction, the pressing force is exerted on the abutment member 36 in the arrow b2 direction (a direction orthogonal to the vibration direction).

The straight line P3 shown by a two-dotted-line in FIG. 24 extends from the abutting portion between the rotor 100 and the abutment member 36 in the vibration direction of the diaphragm 10. The rotor 100 applies a pressing force on the abutment member 36 at about 90 degrees by setting the turning center thereof on the straight line P3. In other words, by applying a force on the rotor 100 in the arrow a3 direction, the pressing force is exerted on the abutment member 36 in the arrow b3 direction (a direction orthogonal to the vibration direction).

Figure 25:
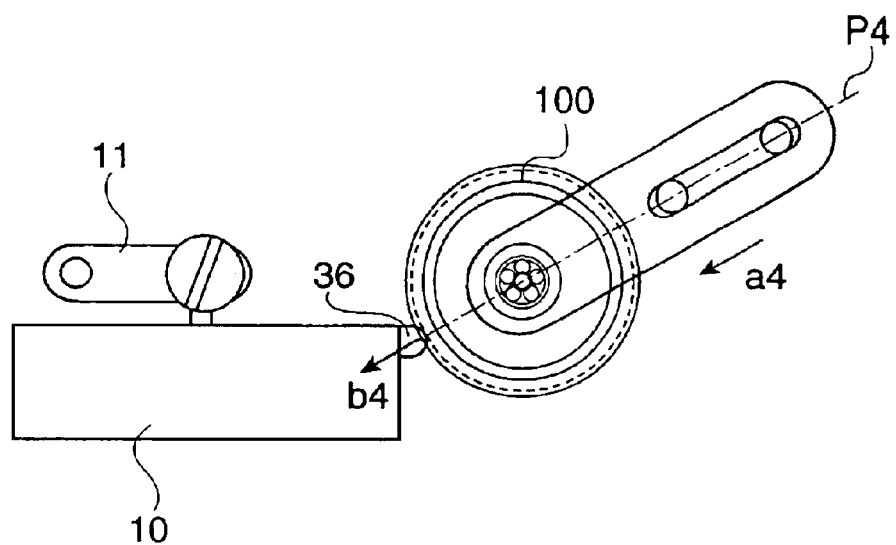
FIGS. 25 and 26 are plan views illustrating the positional relationship between the diaphragm and the rotor when a pressing force is applied in a direction at an angle of 30 degrees with respect to the vibration direction of the diaphragm in this embodiment.
Figure 26:
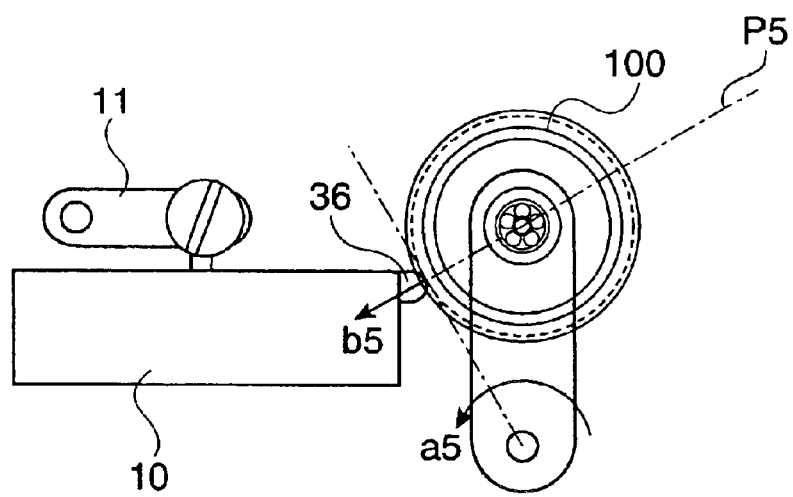

FIGS. 25 and 26 are plan views illustrating the positional relationship between the rotor 100 and the diaphragm 10 in the case that a direction of the pressing force of the rotor 100 applied on the diaphragm 10 is at 30 degrees.

The straight line P4 shown by a two-dotted-line in FIG. 25 extends from the abutting portion between the rotor 100 and the abutment member 36 in a direction at 30 degrees with respect to the vibration direction of the diaphragm 10. When a force is applied on the rotor 100 in the arrow a4 direction, the pressing force is exerted on the abutment member 36 in the arrow direction b4 (a direction at 30 degrees with respect to the vibration direction).

The straight line P5 shown by a two-dotted-line in FIG. 26 extends from the abutting portion between the rotor 100 and the abutment member 36 in a direction at 30 degrees with respect to the vibration direction of the diaphragm 10. The turning center of the rotor 100 is set at a position which lies on a line orthogonal to the straight line P5 and also to which the straight line P5 is tangent. With this arrangement, the rotor 100 applies the pressing force on the abutment member 36 at about 30 degrees. In other words, when a force is applied on the rotor 100 in the arrow a5 direction, the pressing force is exerted on the abutment member 36 in the arrow b5 direction (a direction at 30 degrees with respect to the vibration direction).

The foregoing directions of the pressing force have been described just by way of example. In reality, the optimal pressing direction is determined, taking account of conditions such as a shape and an elastic characteristic of the spring member 23, a position and a shape of the abutment member 36, and a diameter of the rotor 100.

H. Shape of Diaphragm

In order to stabilize the driving characteristic of the piezoelectric actuator, it is required that a longitudinal vibration and a bending secondary vibration are stably produced in the diaphragm so that the abutment member at the top of the diaphragm moves in a periodic manner always along the same orbit.

With respect to this subject, the page 9 of the reference "DENSHIKAIRO-SOSHI TOSHITENO DENKIKIKAI-SHINDOSHI TO SONO OHYO (ELECTROMECHANICAL DIAPHRAGM AS ELECTRONIC CIRCUIT ELEMENT AND ITS APPLICATION)" published by Corona Publishing Co. Ltd. offers a description that a longitudinal vibration and a second lateral vibration of a rectangular diaphragm degenerate when the ratio of its long and short sides is 1 vs. 0.272. The foregoing second lateral vibration corresponds to the bending secondary vibration in this embodiment.

Meanwhile, the diaphragm used for the piezoelectric actuator is not a simple rectangular plate as disclosed in the reference; but it has the abutment member at the top thereof. Therefore, even when the ratio of its long and short sides is arranged so as to be the same as in the reference, a stable longitudinal vibration and a stable bending secondary vibration are not obtained.

With this background in mind, the inventors et al. paid attention on the fact that a mass (inertia) of the abutment member affects on the longitudinal vibration and the bending secondary vibration, and determined the optimal dimensional ratio of the long and short sides of the diaphragm having the abutment member on the basis of the following analysis.

Figures 27, 28:
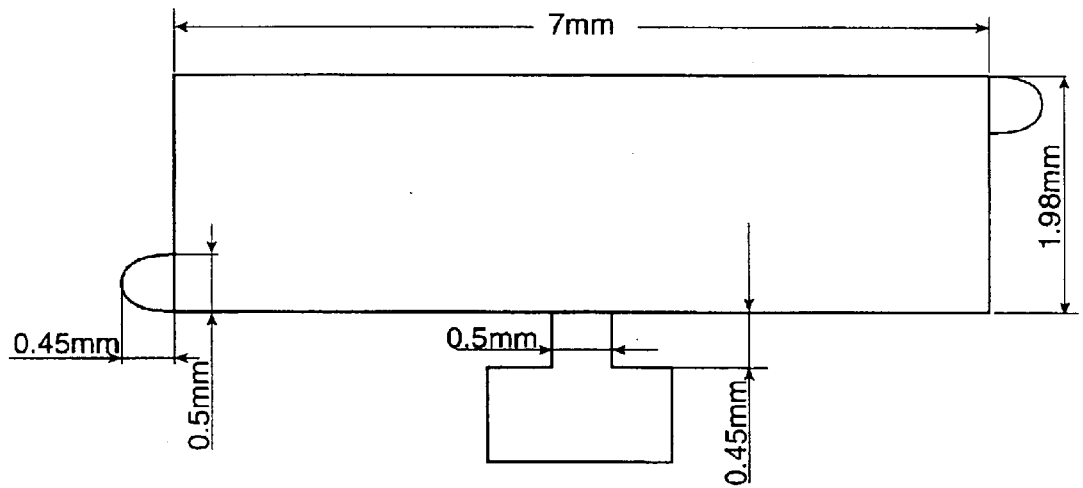
FIG. 27 is a plan view illustrating the specific size of the diaphragm.
FIG. 28 is a table showing resonant frequencies obtained by experiment.

The inventor et al. assumed the diaphragm 10 as shown in FIG. 27. More particularly, the piezoelectric elements are composed of PZT and having a long side of 7 mm and a short side of 1.98 mm. The backing material is composed of a stainless steel (SUS301) and having a thickness of 0.1 mm. The abutment member has a width of 0.5 mm, a protruding length of 0.45 mm, and a mass of 0.16 mg. Also, the abutment member has a beam extending to the fixing member and having a width of 0.4 mm and a length of 0.5 mm.

FIG. 28 shows results of vibration simulations performed with respect to the diaphragms having the above-mentioned shape, with and without the abutment member. The values in the parentheses in FIG. 28 indicate measured values.

The results shown in FIG. 28 reveal that the presence of the abutment member more drastically affects the bending secondary vibration than the longitudinal vibration and makes the difference in resonant frequencies between the longitudinal vibration and the bending secondary vibration larger.

In order to degenerate the longitudinal vibration and the bending secondary vibration, it is considered that reducing the difference, which is made larger by the presence of the abutment member, in resonant frequencies between the longitudinal vibration and the bending secondary vibration is effective.

When the long side and the short side of the diaphragm are respectively denoted by characters a and b, it is known that the resonant frequency f of the longitudinal vibration is given by:

$$f \propto 1/a,$$

and that the resonant frequency f of the bending secondary vibration is given by:

$$f \propto b/a^2.$$

Accordingly, it is understood that, by changing the length b of the short side, the difference in resonant frequencies between the longitudinal vibration and the bending secondary vibration can be made smaller so as to eliminate the affect of the abutment member.

When no abutment member presents, the degeneration occurs when the side ratio b/a is 1/0.272=7 mm/1.90 mm; thus, when the abutment member presents, it is required to arrange the side ratio b/a to be 7 mm/1.92 mm=1/0.274.

It is revealed by the experiment performed for checking this that the experimental optimal value is achieved when the short side has a length of 1.98 mm which is stretched by a length of 0.06 mm. It is inferred that this is because a slight difference in driving frequencies causes to drastically change the ratio of the two vibrations when the two resonant frequency of the longitudinal vibration and the bending secondary vibration come very close to each other. In this case, the side ratio b/a is 1/0.283=7 mm/1.98 mm.

From this experimental result, it is concluded that the optimal side ratio b/a of the diaphragm is in the range $0.274 \leq b/a\ (<1)$.

J. Advantages of This Embodiment

As described above, in this embodiment, the thin piezoelectric actuator A, which can be placed in a limited space such as in a watch, has a structure in which, by pressing the rotor 100, i.e., an object to be driven, against the abutment member 36 of the diaphragm 10, a pressing force is exerted on the rotor 100 and the diaphragm 10 so as to be pressed against each other and the pressing force is adjusted by turning the pressure-adjusting cam 26. With this structure, in this embodiment, the diaphragm 10 can be fixed in a state in which its play (movable clearance) with the base plate 102 is eliminated, different from the conventional case in which a pressing force is produced by pressing the diaphragm 10 against the rotor 100. As a result, deterioration of the driving characteristic of the rotor 100 driven with a vibration of the diaphragm 10, a decrease in durability of the diaphragm 10, and so forth can be drastically improved.

In addition, after the bonding wire 37 is connected with the power-supplying electrode plates 33A to 33D and also with the land of the lead board 14, these connected portions are covered by the potting layers 38; hence, together with the fact that the diaphragm 10 is fixed to the base plate 102 without play (movable clearance), these connected portions have strong electrical connections and are free from poor contact.

As a result, the piezoelectric actuator A has an extended duration of life and its reliability is improved.

Furthermore, by applying an appropriate pressing force on the diaphragm 10, the piezoelectric actuator A can be effectively driven.

I. Modifications

The present invention is not limited to the above-described embodiment; but a variety of modifications can be made as described below.

(1) Configurations of Pressing Mechanism and Adjusting Mechanism

In the foregoing embodiment, the lever 20 having the spring member 23 is used as a pressing mechanism for applying a pressing force on the diaphragm 10 via the rotor 100, and the pressure-adjusting cam 26 is used as an adjusting mechanism for adjusting the pressing force. However, the present invention is not limited to these mechanisms, and it is also applicable to the following example structures.

When the diaphragm 10 and the base plate 102 shown in FIG. 3 have a space therebetween, the spring member may have a shape (for example, a leaf-spring shape, a coil-spring shape, or the like) such that the spring member can be placed in the space, and, in addition, it may be formed independent of the lever 20.

The adjusting mechanism is not limited to the pressure-adjusting cam 26, and it may have any structure by which an elastic force produced by the spring member can be adjusted.

(2) Positional Relationship between Rotor 100 and Diaphragm 10

The number of intermediate wheels interposed between the rotor 100 and the date indicator 50 is not limited to that described in the embodiment; and it is optional. Since the number of the intermediate wheels determines the rotating direction of the rotor 100, it is needed to change the positional relationship between the rotor 100 and the diaphragm 10 in accordance with the number of the intermediate wheels.

(3) Shape of Diaphragm 10

Although the diaphragm 10 has two sheets of the piezoelectric elements 30 and 31 in the foregoing embodiment, the present invention is not limited to this structure and it is also applicable to a diaphragm having a single sheet of a piezoelectric element or having a structure in which more than two sheets of piezoelectric elements are stacked on the diaphragm.

Also, although the diaphragm 10 having a stripe shape is used in the foregoing embodiment, the shape of the diaphragm 10 is not limited to a stripe shape; but a variety of shapes such as a trapezoid, a parallelogram, a diamond, and a triangle can be employed as long as they have a longitudinal portion.

Figure 29:
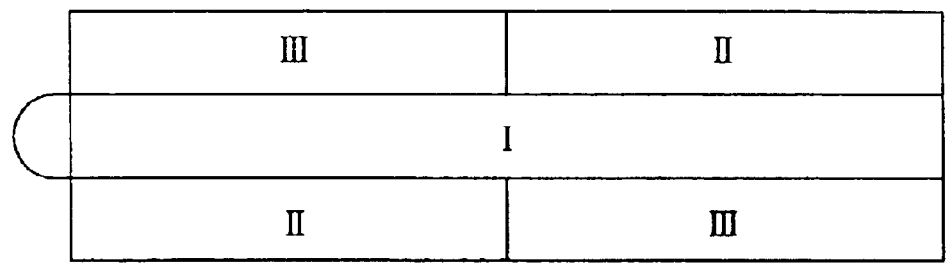
FIGS. 29 to 31 are plan views illustrating example modified electrode plates formed on the piezoelectric element of the diaphragm.
Figure 30:
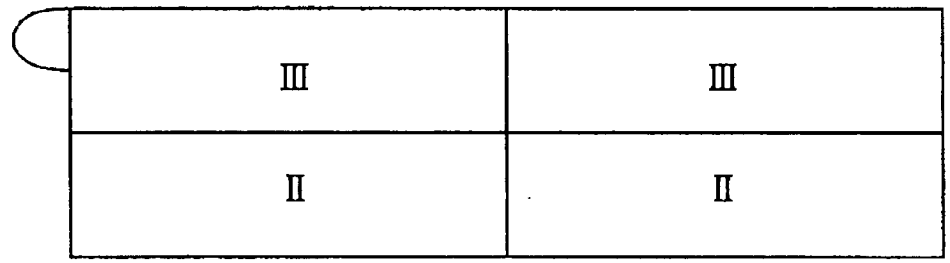
Figure 31:
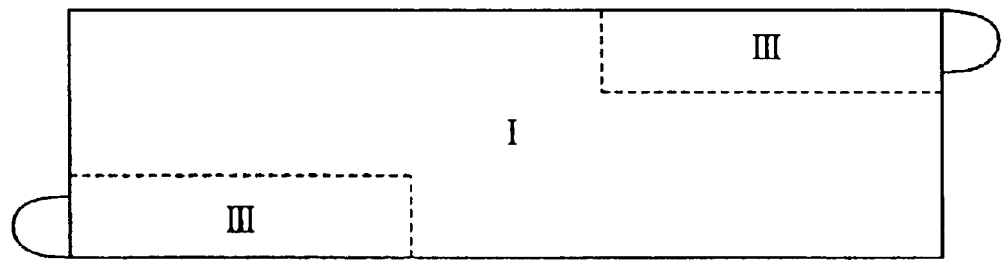

In addition, the shapes of the electrode plates bonded to the piezoelectric elements are not limited to those shown in FIG. 10; but the electrode plates may be formed on the piezoelectric element as shown in FIGS. 29 to 31.

When the electrode plates are formed, for example, as shown in FIG. 29, the diaphragm is driven by feeding drive signals to electrode plates I and II. By producing a longitudinal vibration in the electrode plate I and a vibration in the electrode plate II while preventing a vibration from being produced in an electrode III, the bending secondary vibration thereof is excited since the longitudinal expansion and contraction of the diaphragm becomes imbalanced, thereby causing the abutment member to turn in a certain direction (for example, a clockwise direction) along an elliptic orbit. On the other hand, in order to turn the abutment member in the reverse direction (for example, a counterclockwise direction), the abutment member is driven by feeding drive signals to the electrode plates I and III. A longitudinal vibration is produced in the electrode plate I and a vibration is produced in the electrode plate III while a vibration is prevented from being produced in the electrode plate II. Although the abutment member can turn in forward and reverse direction with the foregoing structure, especially when it is to be driven only in one direction, it will suffice to integrally form the electrode plates I and II.

FIG. 30 illustrates other modified electrode plates wherein the electrode plate I shown in FIG. 29 is eliminated. A longitudinal vibration can be produced in the diaphragm also by feeding a drive signal to the electrode plate II.

FIG. 31 illustrates the whole-surface electrode I by which the diaphragm is driven. In this diaphragm, a bending secondary vibration is excited due to its geometrical imbalance (i.e., the abutment member). As indicated by a broken line, the electrode plates III may be formed such that the piezoelectric element has portions in which no vibration is produced.

By fixing the fixing member 11 by a screw to the fixing-member projection 102A of the base plate 102 and by placing the support abutment member 12 on the support-abutment projection 102B of the base plate 102, the above-mentioned piezoelectric actuator A has a structure in which the diaphragm 10 is supported in a cantilever manner. However, the present invention is not limited to the above-mentioned structure and it is also applicable to a piezoelectric actuator having a structure in which the diaphragm 10 is supported at both side thereof by fixing the support abutment member 12 by a screw to the support-abutment projection 102B in the same fashion as the fixing member 11.

Although the foregoing piezoelectric actuator A has a structure in which the diaphragm 10 and the rotor 100 are disposed on the base plate 102, the present invention is not limited to the base plate 102, and any component will suffice as long as it supports members forming the piezoelectric actuator A.

(4) Variations in Apparatuses Equipped with Piezoelectric Actuator

Although, in the foregoing embodiment, the piezoelectric actuator A is used for the calendar indicating mechanism used in the watch by way of example, the present invention is not limited to this application and it is also applicable to a time-indicating mechanism for indicating a time with a hour hand, a minute hand, and a second hand.

In addition, the present invention is applicable to piezoelectric actuators for use in other kinds of apparatuses, for example, an amusement apparatus such as a toy, and an air-blower. Also, since the piezoelectric actuator A can be made thin and miniaturized as described above, and also can be driven with high efficiency, it is suitable for use in a portable apparatus and the like driven by a battery.

(5) Drive Configurations of Piezoelectric Actuator A

In the foregoing embodiment, the rotor 100 abutting against the abutment member 36 is driven to rotate with a vibration of the diaphragm 10, the present invention is not limited to this application and it is also applicable to a piezoelectric actuator which linearly drives an object to be driven. Even in this case, the object to be driven is formed so as to apply a pressing force on the diaphragm 10.

In the piezoelectric actuator A in the foregoing embodiment, in order to obtain a drive force for driving the rotor 100, for example, a rotor in a wrist watch, with a very small amount of electric energy, the abutment member 36 of the diaphragm 10 is arranged so as to vibrate along an elliptic orbit. However, the present invention is not limited to the foregoing arrangement; alternatively, the rotor 100 may be driven to rotate by longitudinally vibrating the abutment member 36 in the longitudinal direction of the diaphragm 10.

(6) Shape of Base Plate 102

The base plate 102 has a structure in which the fixing-member projection 102A for fixing the fixing member 11 and the support-abutment projection 102B abutting against the support abutment member 12 are formed in a protruding manner in order to fix the diaphragm 10. However, the present invention is not limited to the foregoing structure; alternatively, the base plate 102 may have a depression having an opening so that the diaphragm 10 is supported only by the fixing member 11 and the support abutment member 12.

(7) Calendar Indicating Mechanism

In the foregoing embodiment, although the calendar indicating mechanism is used for indicating a date of calendar information by way of example, it will be appreciated to those skilled in the art that the calendar indicating mechanism can be used for indicting each of a day of the week, a month, and a year.

(8) Lead

Figure 32:
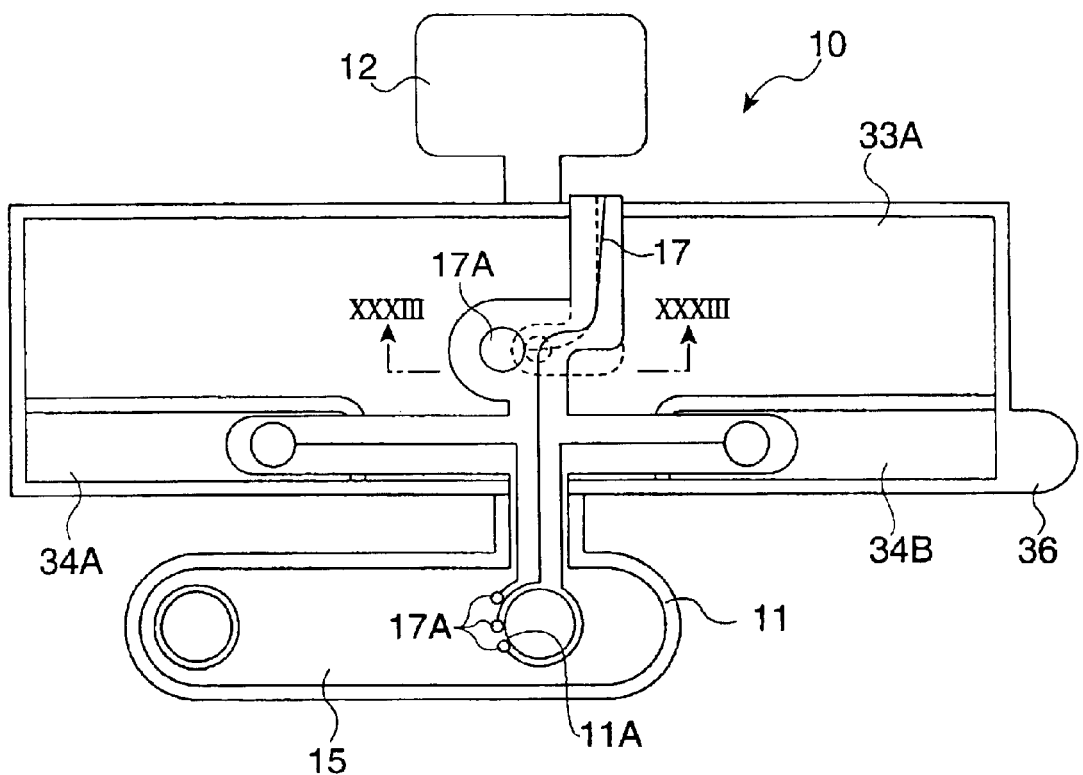
FIG. 32 is a plan view illustrating the diaphragm using the modified electrode plates.
Figure 33:
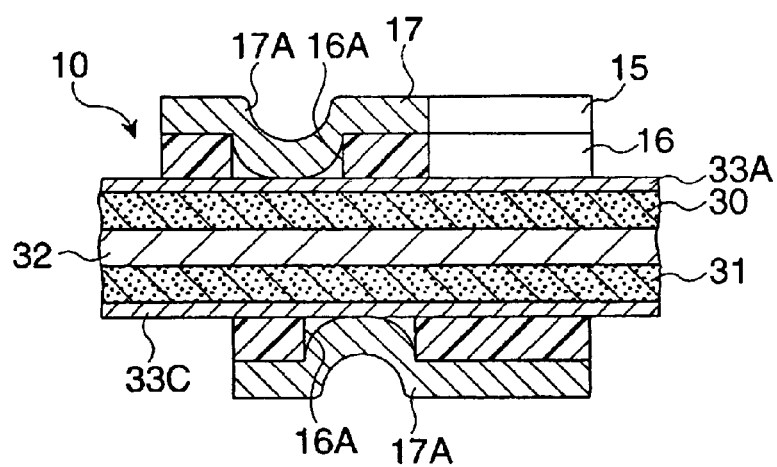
FIG. 33 is a sectional view viewed in the direction from the arrow XXXIII—XXXIII shown in FIG. 32.

Although the piezoelectric elements 30 and 31 and the lands of the lead board 14 are connected by the bonding wire 37 in the foregoing embodiment, the present invention is not limited to this way of connection. As shown in FIGS. 32 and 33, by using a flexible printed circuit (FPC) board as a lead board, the connecting portions of the electrode plates of the piezoelectric elements and the corresponding lands of the lead board may be integrally formed without using the bonding wire 37.

More particularly, as shown in FIG. 32, an FPC board 15 is formed so as to have a shape (approximate cross-shape) extending from the electrode plates 33A, 33C, 34A, and 34B to the fixing member 11. The FPC board 15 is formed by a flexible insulating film 16 and a conducting pattern 17 composed of a copper foil and disposed on the insulating film 16. As shown in FIG. 33, lands 17A of the conducting pattern 17 to be electrically connected to connecting objects have corresponding conducting holes 16A drilled in the insulating film 16. In FIG. 33, of the piezoelectric elements 30 and 31, ones disposed on the backing material 32 are omitted.

When the lands 17A of the FPC board 15 are connected to the electrode plates, as shown in FIG. 33, the lands 17A are passed through the corresponding conducting holes 16A so as to extend loosely to the electrode plates, and then the lands 17A and the corresponding electrode plates are electrically connected to each other by resistance welding, contact bonding, soldering, or the like.

Even when the FPC board 15 is used in place of the bonding wire 37 as described above, these connected portions have strong electrical connections and are free from poor contact.

(9) Connection with External Circuit Board

Although input paths of the drive signals fed to the piezoelectric elements 30 and 31 via the lead board 14 are omitted in the foregoing embodiment, a circuit board 18 equipped with the drive circuit 500 is connected to the lead board 14 in a real wrist watch.

The connecting structure between the lead board 14 and the circuit board 18 will be described with reference to FIGS. 34 and 35.

Figure 34:
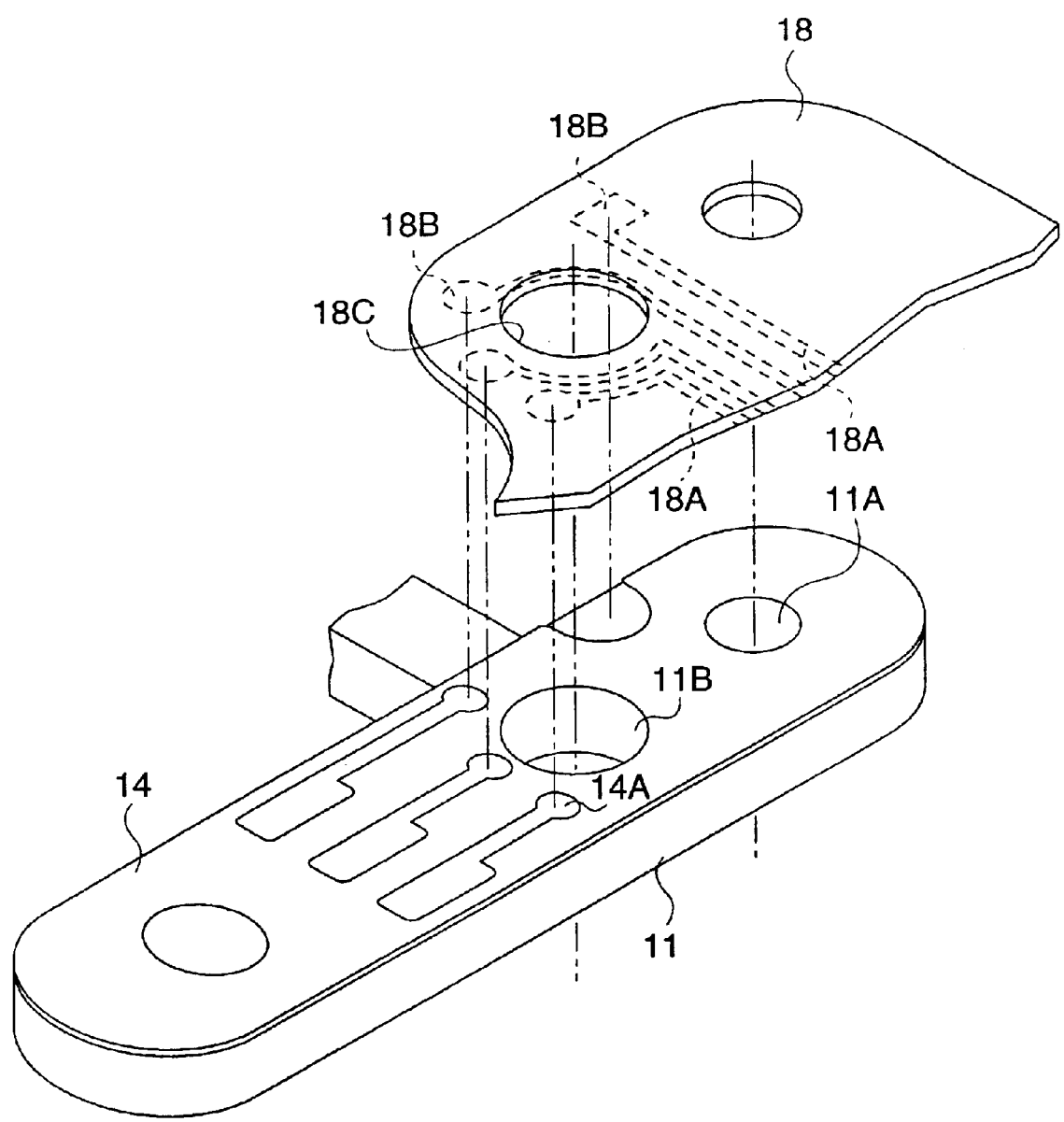
FIG. 34 is a perspective view illustrating a state in which a circuit board has not yet been fixed to a lead board.

As shown in FIG. 34, in the circuit board 18, patterns 18A which are to be connected to the drive circuit 500 (not shown in FIG. 34) are formed on either the front or rear surface of the circuit board 18, which faces the lands 14A of the lead board 14, lands 18B which are to be connected to the patterns 18A are formed at positions facing the lands 14A of the lead board 14, and a fixing hole 18C is formed. The lands 18B are formed so as to surround the fixing hole 18C.

Meanwhile, the fixing member 11 having the lead board 14 disposed thereon has a fixing hole 11B formed at a position thereof different from the positioning hole 11A. The lands 14A of the lead board 14 are formed so as to surround the fixing hole 11B.

Figure 35:
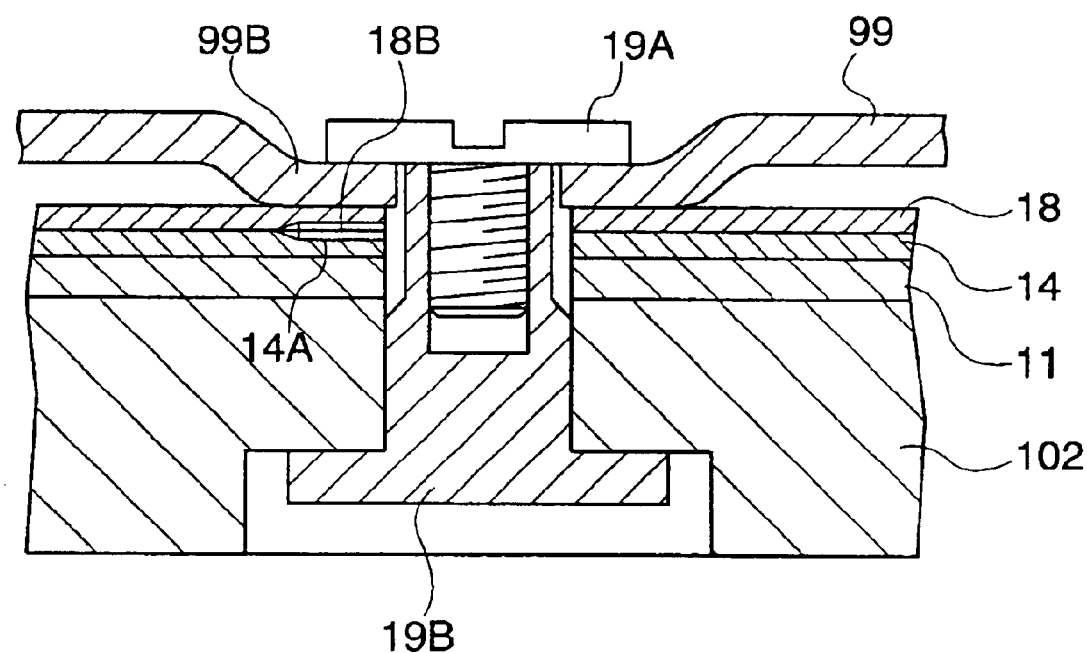
FIG. 35 is a sectional view illustrating a state in which the circuit board is fixed to the lead board.
Figure 36:
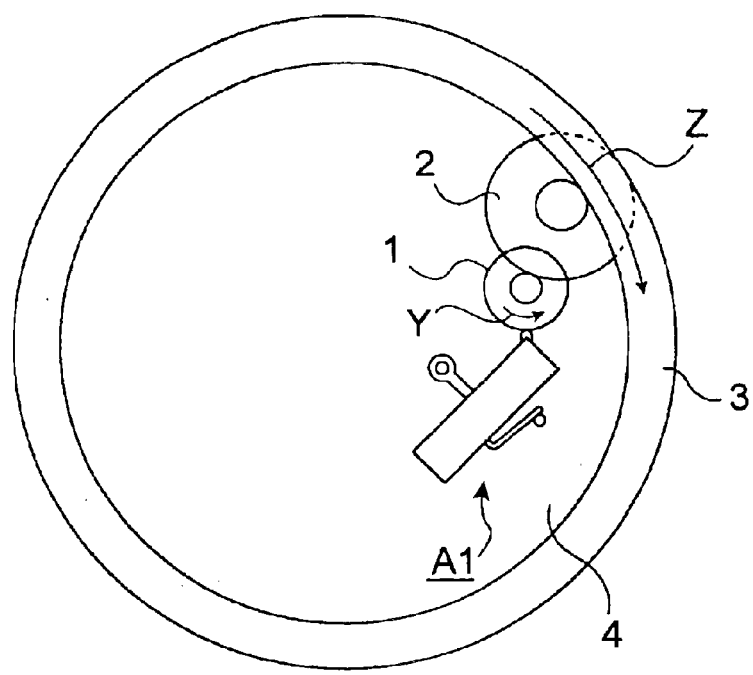
FIG. 36 is a schematic illustration of a calendar indicating mechanism of a known watch.
Figure 37:
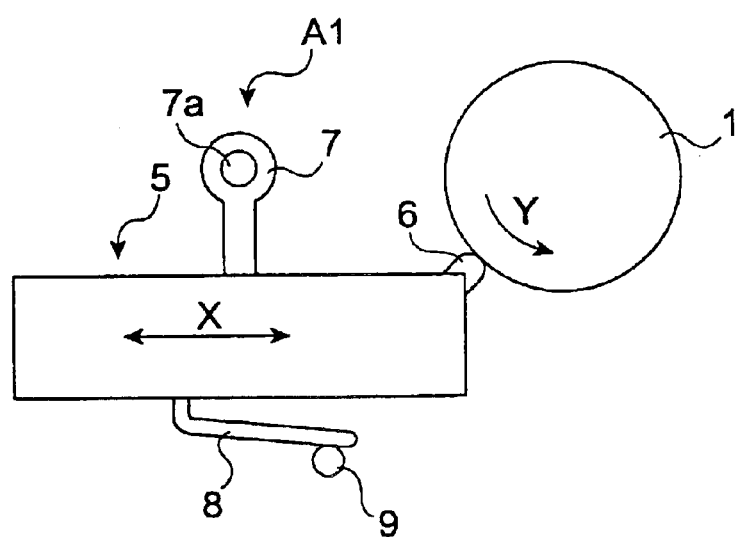
FIG. 37 is a schematic illustration of a known piezoelectric actuator.

As shown in FIG. 35, in a state in which the lands 14A of the lead board 14 and the lands 18B of the circuit board 18 are kept in contact with each other, the lead board 14 and the circuit board 18 are fixed to each other by a screw-engaging member 19B, which passes through the base plate 102 and the pressure plate 99 for fixing them together, and by a screw 19A. The pressure plate 99 has an annular projection 99B formed therein. Since the screw 19A and the screw-engaging member 19B have the annular projection 99B, the circuit board 18, the lead board 14, the fixing member 11, and the base plate 102, all sandwiched therebetween from the top to bottom in that order, the screw 19A and the screw-engaging member 19B exert an urging force on the boards 14 and 18 so as to be pressed against each other. With this arrangement, the lands 18A and the lands 18B are pressed against each other, thereby providing a strong electrical connection therebetween. The screw-engaging member 19B and the screw 19A serve also as fixing means for fixing the fixing member 11 to the base plate 102.

What is claimed is:

1. A piezoelectric actuator, comprising:
   a base;
   a diaphragm which comprises at least one plate-like piezoelectric element and a plate-like backing material affixed thereto and which is adapted to move in the plane of the diaphragm in response to a drive signal applied thereto, the backing material comprising
       a fixing member that is fixed to the base so as to eliminate rotational movement of the diaphragm and to restrict movement of the diaphragm to the plane of the diaphragm, and
       an abutment member disposed on the diaphragm; and
   a pressing mechanism configured to apply a pressing force so as to engage the abutment member with an object to be driven.

2. The piezoelectric actuator according to claim 1, wherein the fixing member maintains the at least one piezoelectric element in a position spaced apart from the base.

3. The piezoelectric actuator according to claim 1, further comprising an adjusting mechanism for adjusting the pressing force applied by the pressing mechanism.

4. The piezoelectric actuator according to claim 1, wherein the pressing mechanism comprises a spring.

5. The piezoelectric actuator according to claim 4, wherein the spring has a curved shape.

6. The piezoelectric actuator according to claim 1, wherein the fixing member is fixed to the base by a screw.

7. The piezoelectric actuator according to claim 1, wherein
   the at least one plate-like piezoelectric element comprises first and second piezoelectric elements respectively stacked on front and rear surfaces of the backing material, each of the first and second piezoelectric elements comprising a plurality of electrode plates,
   the fixing member is formed as a part of the backing material and extends out from the piezoelectric elements, the fixing member comprising a lead board fixed thereto, the lead board including contact terminals for electrically connecting the lead board to a drive circuit configured to generate the drive signal and to drive the first and second piezoelectric elements, and
   each of the plurality of electrode plates of the first and second piezoelectric elements has at least one contact spot that is connected to a contact terminal on the lead board by a bonding wire, each contact terminal and contact spot and portion of the bonding wire connected thereto being covered by a potting layer.

8. The piezoelectric actuator according to claim 7, wherein two of the electrode plates are connected to each other by a bonding wire extending around a side edge of the diaphragm.

9. The piezoelectric actuator according to claim 7, wherein each of the contact spots provides a node point in the corresponding electrode plate when the diaphragm vibrates.

10. The piezoelectric actuator according to claim 7, further comprising:
    a circuit board equipped with the drive circuit, the circuit board including contact terminals for electrical connection to the drive circuit; and
    a pressing-force applying mechanism configured to apply a pressing force between the lead board and the circuit board to maintain electrical contact between corresponding contact terminals on the boards.

11. The piezoelectric actuator according to claim 10, wherein the pressing-force applying mechanism also fixes the fixing member to the base.

12. The piezoelectric actuator according to claim 11, wherein the pressing-force applying mechanism also has a screw-fastening function.

13. The piezoelectric actuator according to claim 1, wherein
    the at least one plate-like piezoelectric element comprises first and second piezoelectric elements respectively stacked on front and rear surfaces of the backing material, each of the first and second piezoelectric elements comprising a plurality of electrode plates, and
    the plurality of electrode plates of the first and second piezoelectric elements are electrically connected to a flexible printed circuit board extending to the fixing member which is formed as a part of the backing material and which extends out from the piezoelectric elements.

14. The piezoelectric actuator according to claim 13, wherein two of the electrode plates are connected to each other by the flexible printed circuit board extending around a side edge of the diaphragm.

15. The piezoelectric actuator according to claim 13, wherein each spot of the electrode plates which is connected to the flexible printed circuit board provides a node point in the corresponding electrode plate when the diaphragm vibrates.

16. The piezoelectric actuator according to claim 13, further comprising:
    a circuit board equipped with a drive circuit and including contact terminals electrically connected to the drive circuit; and
    a pressing-force applying mechanism configured to apply a pressing force between a portion of the flexible printed circuit board extending to the fixing member and the circuit board to maintain electrical contact between corresponding contact terminals on the boards.

17. The piezoelectric actuator according to claim 16, wherein the pressing-force applying mechanism also fixes the fixing member to the base.

18. The piezoelectric actuator according to claim 17, wherein the pressing-force applying mechanism also has a screw-fastening function.

19. A piezoelectric actuator, comprising:

a base;

a diaphragm which comprises at least one plate-like piezoelectric element and a plate-like backing material affixed thereto and which is adapted to move in the plane of the diaphragm in response to a drive signal applied thereto, the backing material comprising a fixing member that is fixed to the base so as to eliminate rotational movement of the diaphragm and to restrict movement of the diaphragm to the plane of the diaphragm, and an abutment member disposed on the diaphragm;

an object to be driven in response to movement of the diaphragm via the abutment member which is in contact with the object to be driven; and a pressing mechanism configured to apply a pressing force on the abutment member from the object to be driven.

20. The piezoelectric actuator according to claim 19, wherein the object to be driven comprises a rotor adapted to rotate in response to a drive force transmitted by the abutment member resulting from movement of the diaphragm, and the pressing mechanism comprises a lever having a rotor-fixing member at one end portion thereof adapted to rotatably hold the rotor and a spring at another end portion thereof for producing an elastic force as the pressing force.

21. The piezoelectric actuator according to claim 19, further comprising an adjusting mechanism configured to adjust the elastic force applied by the pressing mechanism.

22. The piezoelectric actuator according to claim 21, wherein the object to be driven comprises a rotor adapted to rotate in response to a drive force transmitted by the abutment member resulting from movement of the diaphragm, the pressing mechanism comprises a spring adapted to urge the rotor against the abutment member, and the adjusting mechanism comprises an eccentric cam which is rotatably supported by the base so as to rotate about its own axis and which adjusts the pressing force that urges the rotor against the abutment member by forcibly pressing one end thereof against the spring.

23. The piezoelectric actuator according to claim 19, wherein the object to be driven comprises a rotor adapted to rotate in response to a drive force transmitted by the abutment member resulting from movement of the diaphragm, the pressing mechanism comprises a lever that comprises a rotor-fixing member at one end portion thereof adapted to rotatably hold the rotor and a spring at another end portion thereof to produce an elastic force, and the adjusting mechanism comprises an eccentric cam which is rotatably supported by the base so as to rotate about its own axis and which adjusts the pressing force that urges the rotor against the abutment member by forcibly pressing one end thereof against the spring.

24. A timepiece, comprising:

a piezoelectric actuator comprising:

a base, a diaphragm which comprises at least one plate-like piezoelectric element and a plate-like backing material affixed thereto and which is adapted to move in the plane of the diaphragm in response to a drive signal applied thereto, the backing material comprising a fixing member that is fixed to the base so as to eliminate rotational movement of the diaphragm and to restrict movement of the diaphragm to the plane of the diaphragm, and an abutment member disposed on the diaphragm, and a pressing mechanism configured to apply a pressing force so as to engage the abutment member with an object to be driven;

a drive circuit for supplying the drive signal to the at least one piezoelectric element;

a power source for supplying power to the drive circuit; and means for indicating time-information driven by the piezoelectric actuator.

25. The timepiece according to claim 24, wherein the at least one plate-like piezoelectric element comprises a plurality of electrode plates, all of which are electrically insulated from a reference potential portion of the time piece.

26. The timepiece according to claim 25, wherein the base comprises a non-conductive material.

27. The timepiece according to claim 25, further comprising an insulating plate sandwiched between the base and the fixing member.

28. A portable apparatus, comprising:

a piezoelectric actuator comprising:

a base, a diaphragm which comprises at least one plate-like piezoelectric element and a plate-like backing material affixed thereto and which is adapted to move in the plane of the diaphragm in response to a drive signal applied thereto, the backing material comprising a fixing member that is fixed to the base so as to eliminate rotational movement of the diaphragm and to restrict movement of the diaphragm to the plane of the diaphragm, and an abutment member disposed on the diaphragm, and a pressing mechanism configured to apply a pressing force so as to engage the abutment member with an object to be driven;

a drive circuit for supplying the drive signal to the at least one piezoelectric element;

a power source for supplying power to the drive circuit; and an object to be driven by the piezoelectric actuator.

29. The portable apparatus according to claim 28, wherein the at least one plate-like piezoelectric element comprises a plurality of electrode plates, all of which are electrically insulated from a reference potential part of the portable apparatus.

30. The portable apparatus according to claim 29, wherein the base comprises a non-conductive material.

31. The portable apparatus according to claim 29, further comprising an insulating plate sandwiched between the base and the fixing member.

* * * * *